(12) United States Patent
Shibayama

(10) Patent No.: US 9,690,179 B2
(45) Date of Patent: Jun. 27, 2017

(54) ILLUMINATION UNIT AND IMAGE DISPLAY DEVICE INCORPORATING SAME

(71) Applicant: Yasuyuki Shibayama, Ebina (JP)

(72) Inventor: Yasuyuki Shibayama, Ebina (JP)

(73) Assignee: RICOH COMPANY, LTD., Tokyo (JP)

( * ) Notice: Subject to any disclaimer, the term of this patent is extended or adjusted under 35 U.S.C. 154(b) by 339 days.

(21) Appl. No.: 14/487,256

(22) Filed: Sep. 16, 2014

(65) Prior Publication Data
US 2015/0077725 A1 Mar. 19, 2015

(30) Foreign Application Priority Data

Sep. 17, 2013 (JP) .................................. 2013-191293
Mar. 13, 2014 (JP) .................................. 2014-049655

(51) Int. Cl.
| G03B 21/28 | (2006.01) |
| H04N 5/74 | (2006.01) |
| G03B 21/20 | (2006.01) |
| G03B 21/14 | (2006.01) |
| H04N 9/31 | (2006.01) |

(52) U.S. Cl.
CPC ....... G03B 21/2066 (2013.01); G03B 21/147 (2013.01); H04N 5/7458 (2013.01); H04N 9/3152 (2013.01)

(58) Field of Classification Search
CPC .......... F21V 13/00; F21V 13/06; F21V 14/04; F21V 7/04; F21V 7/09; G03B 21/2066; G03B 21/147; G03B 21/28; H04N 5/7458; H04N 5/74

USPC ............... 353/98, 99, 31; 348/742, 743, 771
See application file for complete search history.

(56) References Cited

U.S. PATENT DOCUMENTS

| 5,844,588 A * | 12/1998 | Anderson .......... G02B 26/0841 347/135 |
| 6,457,834 B1 * | 10/2002 | Cotton ............... G02B 27/0025 353/122 |
| 2009/0141503 A1 * | 6/2009 | Phillips, III .......... G02B 13/10 362/311.06 |
| 2013/0044294 A1 | 2/2013 | Shibayama et al. |
| 2013/0050391 A1 * | 2/2013 | Maeda .................... B41J 2/465 347/259 |
| 2013/0107233 A1 | 5/2013 | Hirakawa et al. |
| 2013/0107234 A1 | 5/2013 | Nishina et al. |
| 2013/0114053 A1 | 5/2013 | Tatsuno et al. |
| 2014/0118818 A1 | 5/2014 | Nishina et al. |
| 2014/0126045 A1 | 5/2014 | Tatsuno et al. |

FOREIGN PATENT DOCUMENTS

| JP | 2002-268010 | 9/2002 |
| JP | 2004-184626 | 7/2004 |

* cited by examiner

Primary Examiner — William C Dowling
(74) Attorney, Agent, or Firm — Oblon, McClelland, Maier & Neustadt, L.L.P.

(57) ABSTRACT

An illumination unit includes a light source, an optical mixer to form secondary light sources from a light beam from the light source, and an illumination system to illuminate an optical modulator with the light beam from the optical mixer, including an optical element having an anamorphic surface, in which the optical element is rotated at a certain rotational angle about a rotational axis which is a normal line from a vertex of a surface of the optical element.

14 Claims, 28 Drawing Sheets

ILLUMINATION UNIT AND IMAGE DISPLAY DEVICE INCORPORATING SAME

CROSS REFERENCE TO RELATED APPLICATION

The present application is based on and claims priority from Japanese Patent Application No. 2013-191293, filed on Sep. 17, 2013 and No. 2014-49655, filed on Mar. 13, 2014 the disclosure of which is hereby incorporated by reference in its entirety.

BACKGROUND OF THE INVENTION

Field of the Invention

The present invention relates to an illumination unit and an image display device illumination incorporating the same.

Description of the Related Art

An image display device such as a front-projection type projector is widely used for business presentation, formal education, and household use, for example, to project an image on a screen placed ahead of the device.

The brightness of an image on the projection plane of the image display device is determined by the power of a light source and optical use efficiency of an optical system. Herein, the optical use efficiency refers to a ratio of the intensity of a reflected beam to that of illumination. To improve the optical use efficiency of the image display device, it is necessary to enhance the transmittance and reflectivity of optical elements of the optical system or reduce a loss of light amount due to vignetting on the optical path.

The transmittance and reflectivity of an optical element can be improved to several % or less by applying non-reflective coating onto at least either incidence surface or exit surface thereof.

A loss of light amount due to vignetting is caused by a light-projected area larger than the effective area of the optical element. There are two kinds of such optical loss in an image display device comprising an optical tunnel and a DMD (Digital Micromirror Device), that is, an optical tunnel coupling loss and a DMD loss.

The optical tunnel coupling loss refers to a loss of light amount occurring on an optical path from light emission from a light source to light incidence on the optical tunnel.

The DMD loss is a loss of light amount occurring when a light beam reflected by the optical element of an illumination system is projected on the DMD. That is, the DMD loss occurs because a light beam projected to the DMD (hereinafter, DMD projection beam) is larger in size than the effective area of the DMD and distorted in shape relative to the effective area. Herein, the effective area refers to an area on the DMD by which the DMD projection beam can be reflected.

In view of this, it is needed to realize an illumination unit which is able to illuminate a projection plane brightly while reducing the DMD loss.

For instance, Japanese Laid-open Patent Application Publication No. 2004-184626 (Reference 1) discloses an image display device which comprises an imaging system to form an image of light from a light source and a projection system to project a formed image on a screen. It teaches an illumination system comprising a rod integrator, a relay lens, a first mirror, a second mirror, and a condenser lens.

Reference 1 also discloses that the second mirror includes a rotationally asymmetric reflective surface with a larger curvature radius corresponding to a long side of an exit of the rod integrator than a curvature radius corresponding to a short side thereof, for the purpose of acquiring a high imaging performance with a reduction of astigmatism.

Further, Japanese Laid-open Patent Application Publication No. 2002-268010 (Reference 2) teaches an illumination system comprising a cylinder mirror and a spherical mirror as the first and second mirrors, respectively.

However, Reference 1 and 2 are silent about the provision of a mirror with an anamorphic surface which can suppress the DMD loss and brightly illuminate the projection plane by optimizing the shape of the DMD projection beam.

Further, in Reference 1 the reflective surfaces of the first and second mirrors are both anamorphic and free-form surfaces with high-order extended aspheric coefficients. Therefore, it is a problem that it takes a lot of time to inspect the shapes of the reflective surfaces to determine whether they are properly formed.

SUMMARY OF THE INVENTION

The present invention aims to provide an illumination unit of a simple structure which can brightly illuminate a projection plane.

According to one embodiment, an illumination unit comprises a light source, an optical mixer to form secondary light sources from a light beam from the light source, and an illumination system to illuminate an optical modulator with the light beam from the optical mixer, including an optical element having an anamorphic surface, in which the optical element is rotated at a certain rotational angle about a rotational axis which is a normal line from a vertex of a surface of the optical element.

BRIEF DESCRIPTION OF THE DRAWINGS

Features, embodiments, and advantages of the present invention will become apparent from the following detailed description with reference to the accompanying drawings.

DETAILED DESCRIPTION OF PREFERRED EMBODIMENT

Hereinafter, embodiments of an illumination unit and an image display device incorporating the illumination unit will be described in detail with reference to the accompanying drawings. Wherever possible, the same reference numbers will be used throughout the drawings to refer to the same or like parts.

First Embodiment

Figure 1:
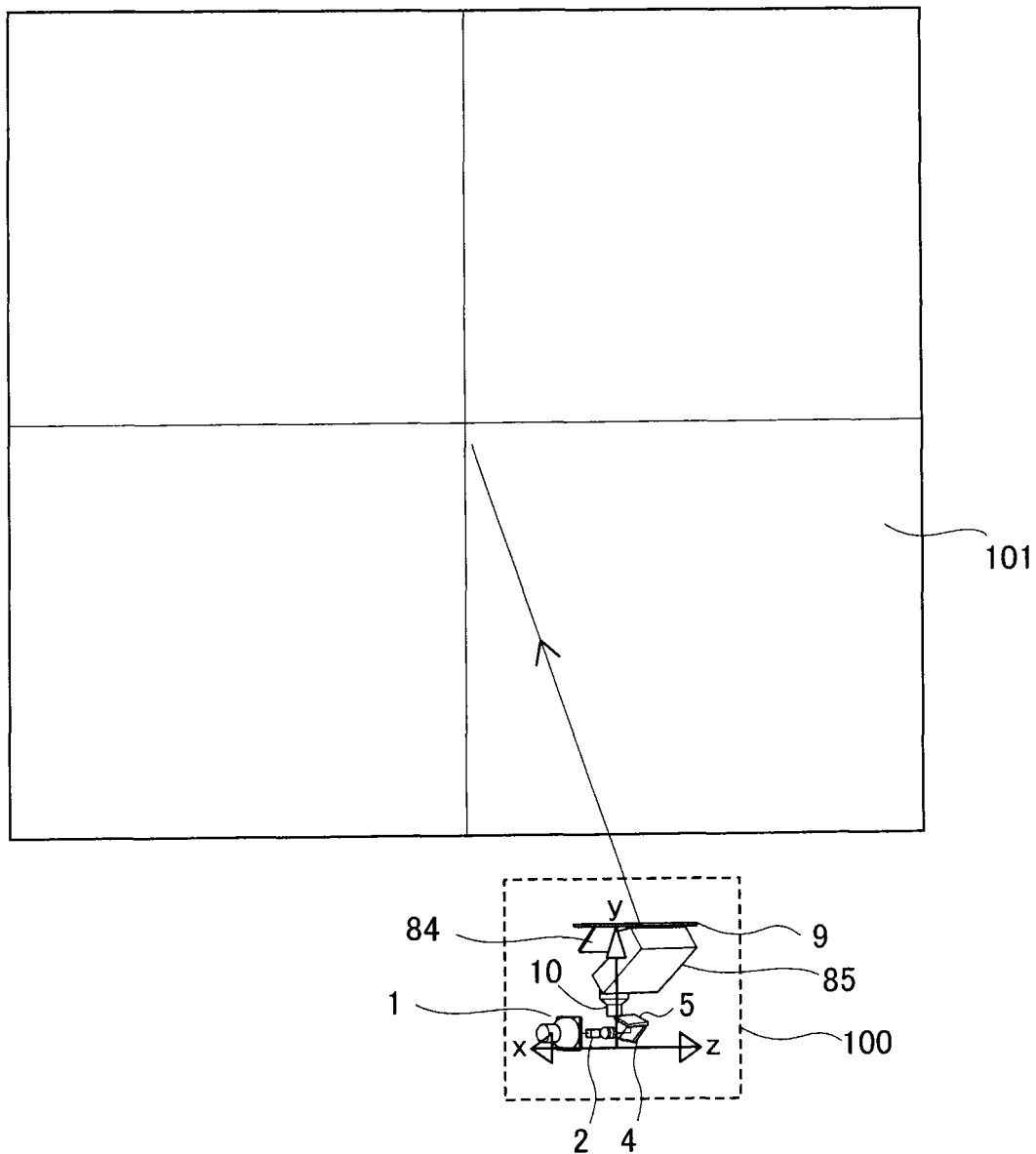
FIG. 1 schematically shows the structure of an image display device according to a first embodiment.

An image display device according to a first embodiment is described. FIG. 1 schematically shows the structure of an image display device 100 according to the first embodiment. It comprises a light source 1, an optical tunnel 2, and an illumination system from the light source 1 to a DMD 7 and including a first mirror 4 and a second mirror 5.

An illumination unit according to the first embodiment is comprised of the light source 1, optical tunnel 2, and illumination system.

Further, the image display device 100 comprises a projection system 8 from the DMD to a projection plane 101 as a screen, including a lens barrel 10 containing a not-shown lens system, a first projection mirror 84, a second projection mirror 85, and a planar glass 9. The image display device projects an image onto the projection plane 101 through the illumination system and projection system.

Note that in the following the origin O of an absolute coordinate system (xyz system) is defined to be the center of the DMD. X-axis is defined to be a direction on the surface of the DMD on which micromirrors are mounted, z-axis is defined to be a direction orthogonal to the x-axis, and y-axis is defined to be a direction orthogonal to the x-axis and y-axis and along a normal line of the DMD 7. Further, when a surface shape of the DMD is rectangular, the x-axis is parallel to the short side of the DMD 7 and the z-axis is parallel to the long side thereof.

Moreover, rotational angles around the x-axis, y-axis, and z-axis are set to be rotational angles $\alpha$, $\beta$, $\gamma$, respectively.

Figure 2:
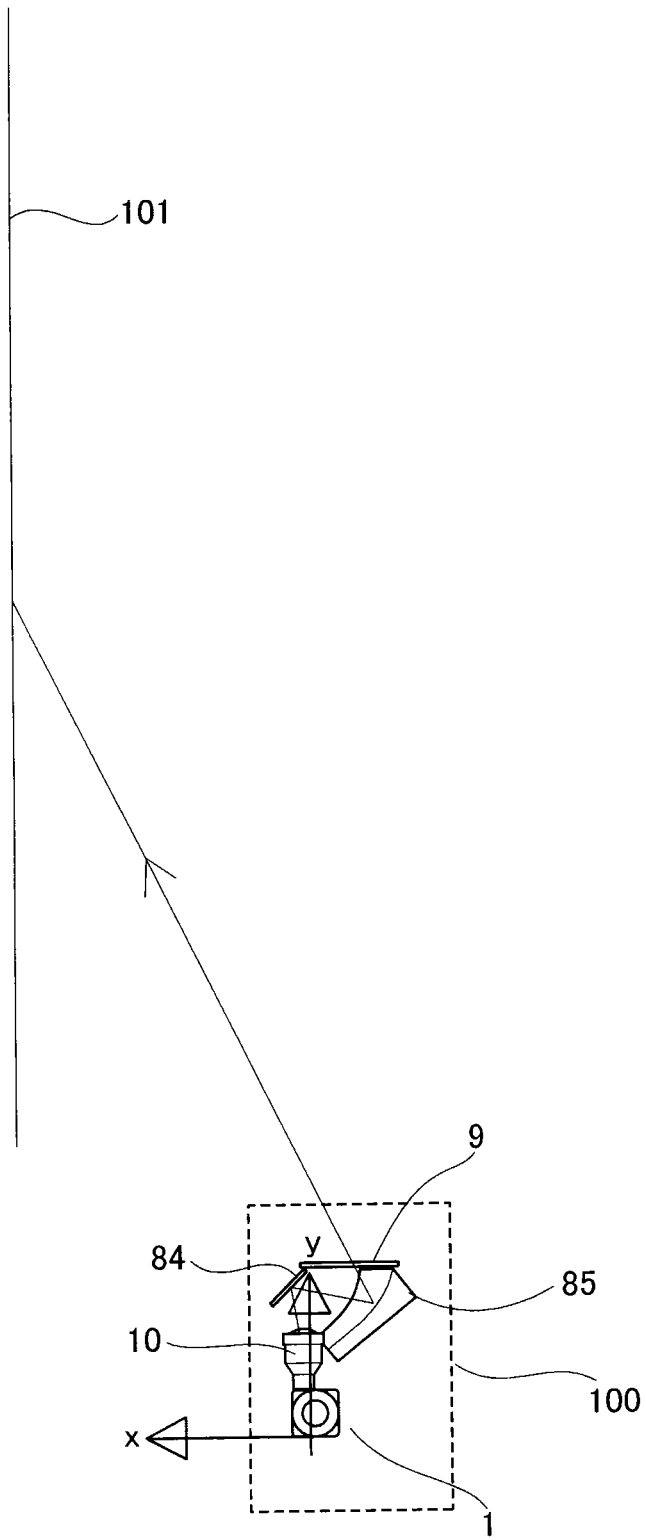
FIG. 2 shows one example of a positional relationship between the image display device and a projection plane.

FIG. 2 shows the positional relationship between the image display device 100 and projection plane 101 by way of example. In the image display device 100 the lens system is contained in the lens barrel 10 with the optical axis thereof parallel to the projection plane 101, and the first projection mirror 84 and second projection mirror 85 are placed to reflect the light beam having transmitted through the lens system to the projection plane 101.

The projection system of the image display device 100 should not be limited to the one described above. Alternatively, the optical axis of the lens system can approximately oppose the projection plane.

Figure 3:
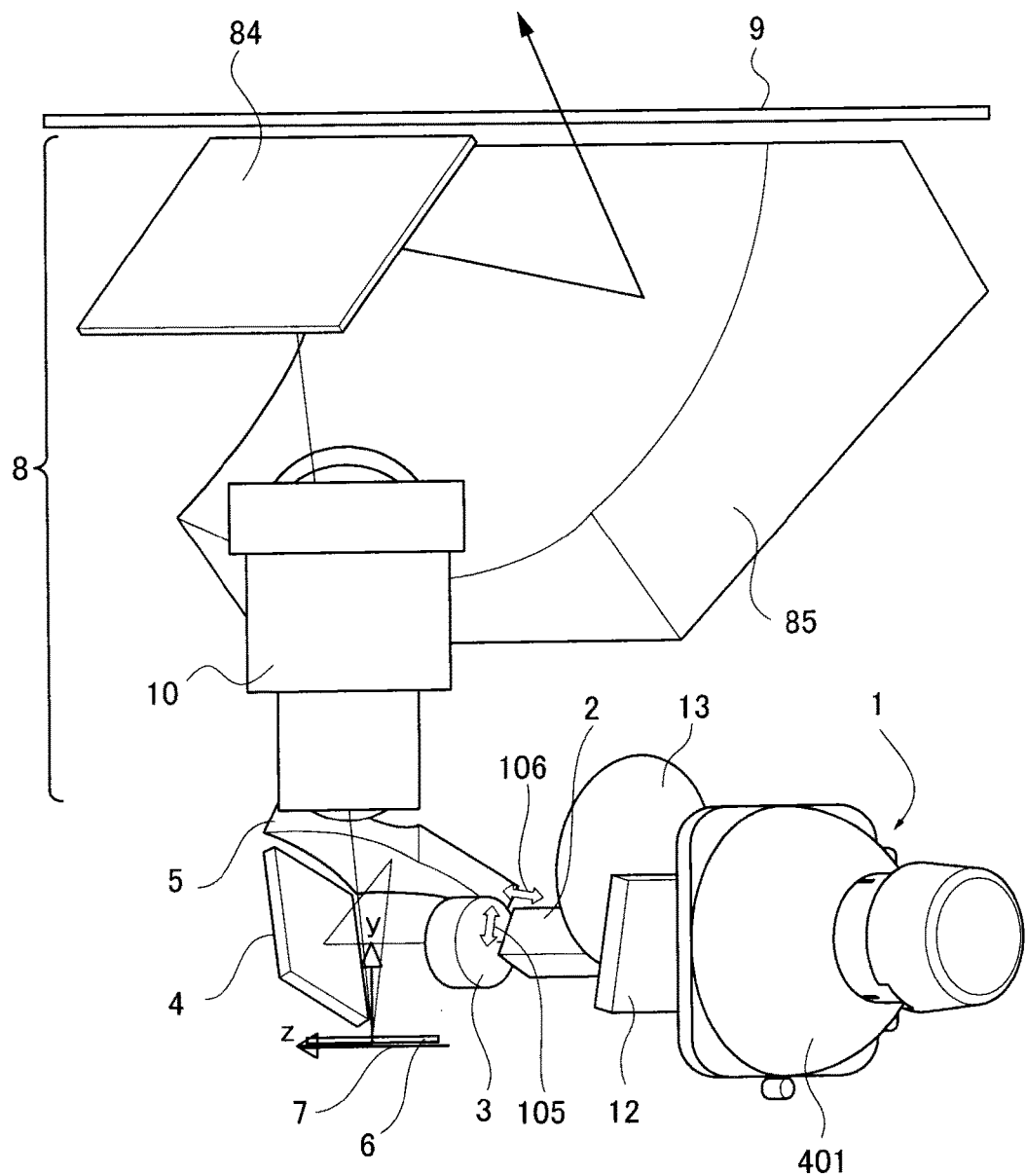
FIG. 3 shows the arrangement of optical elements of the image display device.
Figure 4:
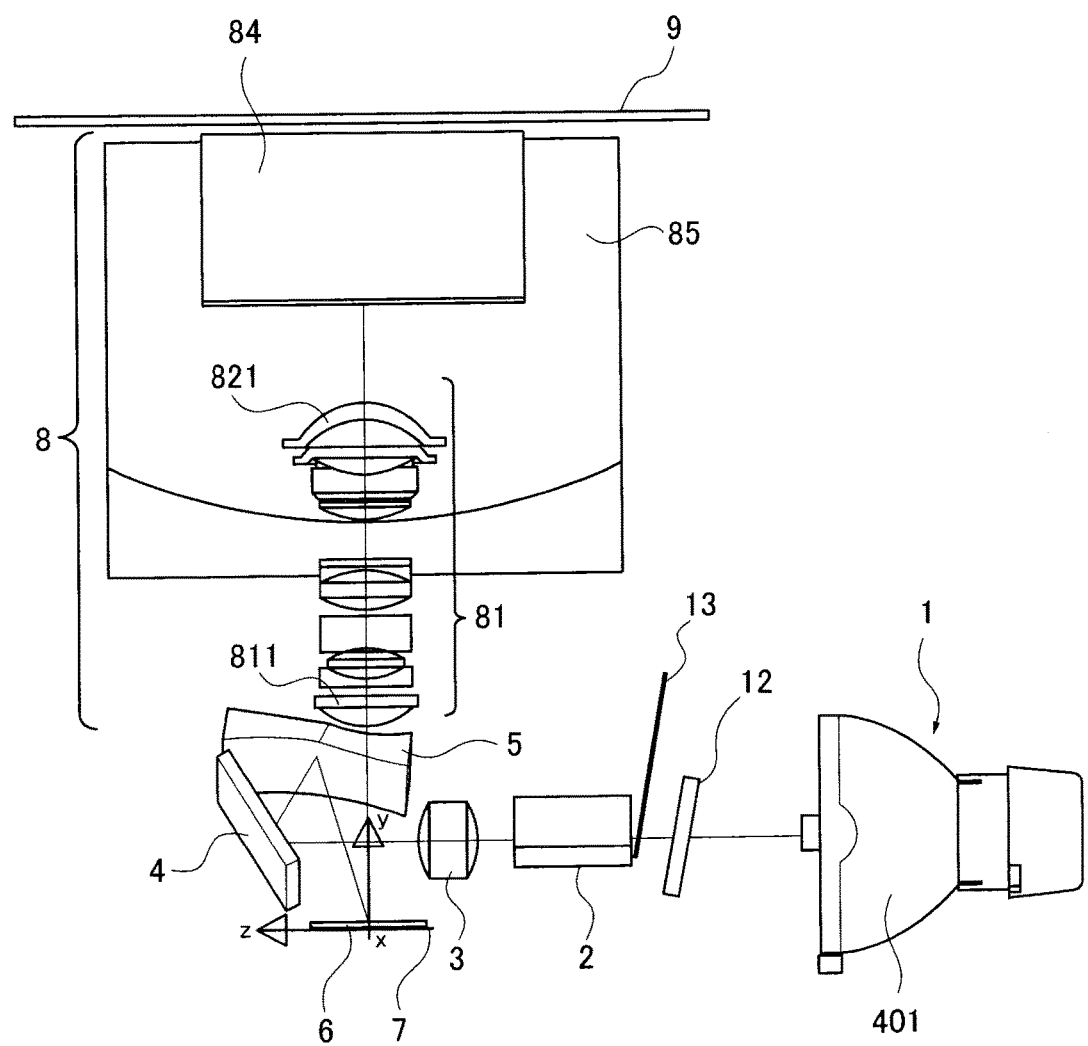
FIG. 4 shows the arrangement of optical elements of the image display device.

Next, the structure of the image display device 100 is described. FIG. 3 and FIG. 4 show the optical elements of the image display device 100. The image display device 100 comprises the light source 1, optical tunnel 2, first mirror 4, second mirror 5, a cover glass 6, the DMD 7, projection system 8, planar glass 9, an explosion-proof glass 12, and a color wheel 13.

Next, the structure of the illumination unit according to the present embodiment is described. The illumination unit comprises the light source 1, optical tunnel 2, explosion-proof glass 12, and color wheel 13, and first and second mirrors 4, 5, to evenly illuminate the reflective surface of the DMD 7 with the light beam from the light source 1.

The light source 1 includes a reflector 401 having a condenser mirror and a light emitter 400 such as a xenon lamp, mercury lamp, or metal halide lamp.

In the light source 1 a light beam from the light emitter 400 is collected on a certain position by the condenser mirror and forms an image of the light source or light emitter. The optical axis of the light beam from the light source 1 is the z-axis.

A not-shown lamp cover is attached to the front end of the light source 1. The explosion-proof glass 12 and color wheel 13 are provided at a certain tilt angle at the front surface of the lamp cover.

The reflector 401 collects the light beam from the light source 1 to form an image at a certain position.

Figure 5:
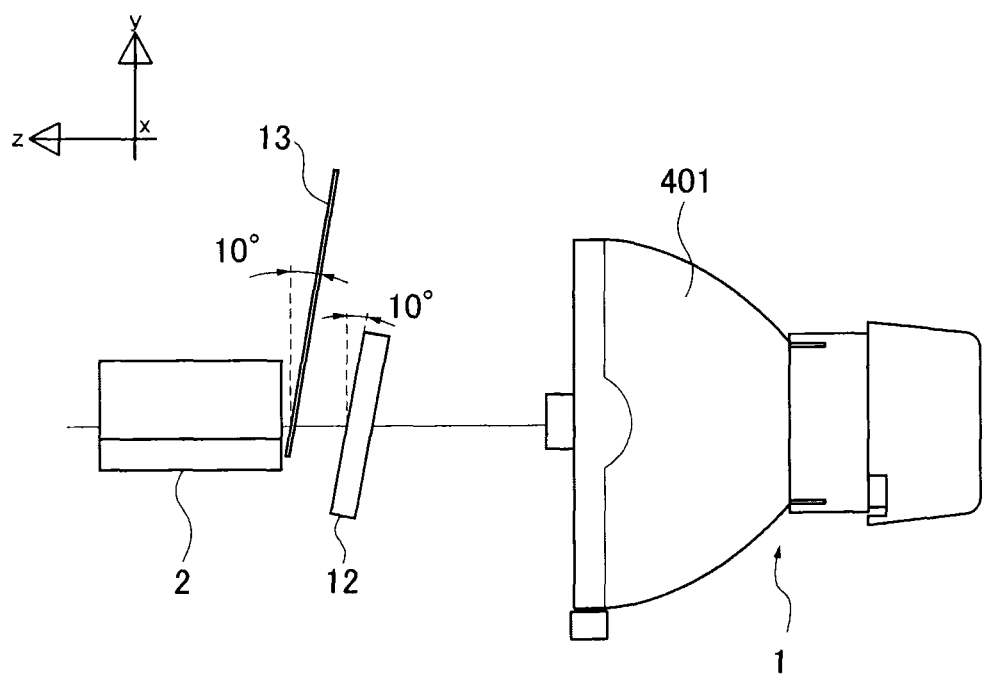
FIG. 5 schematically shows the structure of the image display device from a light source to an optical tunnel.

FIG. 5 shows the structure of the image display device 100 from the light source 1 to the optical tunnel 2. The explosion-proof glass 12 and color wheel 13 are provided at the front surface of the lamp cover between the light emitter 400 and optical tunnel 2 and they are inclined to the optical axis (z-axis in FIG. 5) of the light source 1 at a certain angle (for example, 10 degrees).

The color wheel 13 is a known optical filter having a ring portion divided into three corresponding to three primary colors, red (R), green (G), and blue (B). Alternatively, it can be an optical filter divided into four corresponding to red, green, blue, and white (W).

The light beam from the light source 1 crosses the ring portion of the color wheel 13 in rotation, time-divided into RGB or RGB and W color beams and is incident on the optical tunnel 2. Thus, the image display device 100 projects an image corresponding to the optical color filters of the color wheel 13 onto the projection plane 101 and forms a color image thereon.

The optical tunnel 2 is disposed so that an incident end is positioned in the vicinity of an optical focal position behind the color wheel 13. Because of this, the light beam from the light source 1 is efficiently incident on the optical tunnel 2. It corresponds to an optical mixer having a rectangular opening. It is a tube of four mirror plates with mirror surfaces facing inward. Alternatively, the optical mixer can be a known rod integrator or light pipe in addition to the optical tunnel 2, for example.

In the optical tunnel 2 the incident light is repeatedly reflected by the four mirrors provided inside to form images of secondary light sources from a light source image. Therefore, the optical tunnel 2 emits light with a rectangular transverse cross section having even illuminance distribution.

A lens 3 and the first and second mirrors 4, 5 are arranged in this order on the optical path of the light beam from the optical tunnel 2.

The lens 3 is a condenser lens placed approximately on the path of a traveling light beam from the optical tunnel 2. It comprises a single lens having an aspheric surface at the exit side. Herein, the aspheric surface is represented by the following Expression 1, a later-described curvature radius, and an aspheric coefficient.

$$z'(x', y') = \frac{cr^2}{1 + \sqrt{1 - c^2 r^2}} + \sum_k c_{2k} r^{2k}, \quad \text{Expression 1}$$

$$c = \frac{1}{R}, r = \sqrt{(x')^2 + (y')^2}$$

In Expression 1 "z'" is represented by a local coordinate system x', y', z' with a vertex of each lens surface set to origin. That is, "z" is a sag amount of a lens surface.

The first mirror 4 is a planar mirror approximately on the path of a traveling light beam from the optical tunnel 2. The first mirror 4 is inclined relative to both of the x-axis and z-axis to bend the light beam from the lens 3 obliquely backward and upward.

The second mirror 5 is placed to bend a reflected light from the first mirror 4 to the DMD 7 provided below. The second mirror 5 is inclined relative to both of the x-axis and z-axis.

Figure 6:
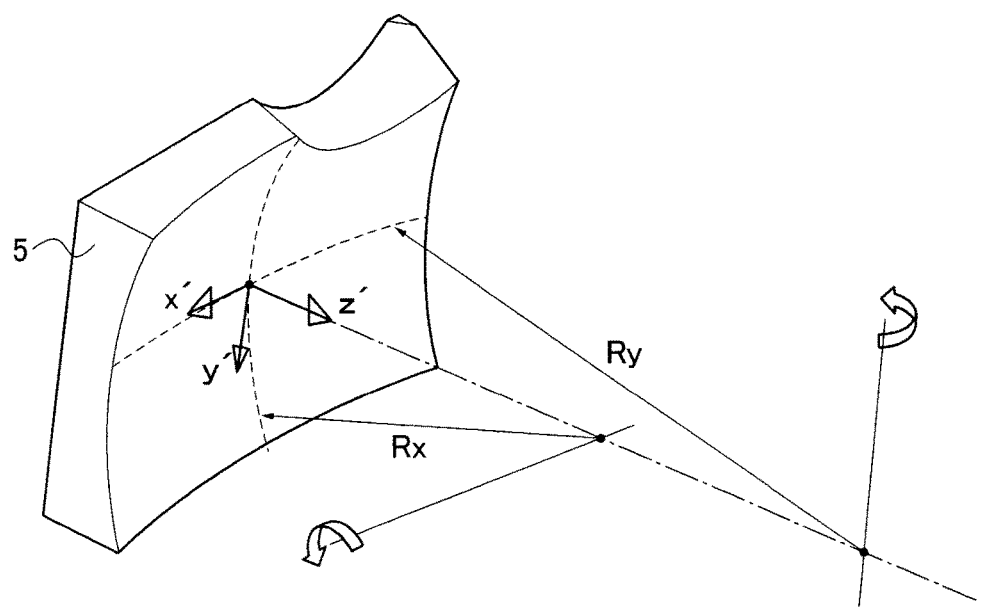
FIG. 6 is a perspective view of a second mirror of an illumination system of the image display device.

FIG. 6 is a perspective view of the second mirror 5. As shown in the drawing, the second mirror 5 comprises a reflective surface which is anamorphic and toroidal specifically.

The toroidal surface of the second mirror 5 is an x-toroidal, concave surface formed by rotating an arc around an axis parallel to the y'-axis with a curvature radius Ry=79.3 mm about an axis parallel to the x'-axis with a curvature radius Rx=70.0 mm in the local coordinate system x', y' z'. Here, a relation between the curvature radiuses Ry and Rx is |Ry|>|Rx|. The toroidal surface is an aspheric surface defined by the following Expression 2:

$$z'(x', y') = \frac{\frac{2(x')^2}{\alpha R_x} - \frac{(x')^4}{\alpha^2 R_x^2 R_y} + \frac{(y')^2}{R_y}}{1 + \sqrt{\left\{1 - \frac{(x')^2}{\alpha R_x R_y}\right\}^2 - \left(\frac{y'}{R_y}\right)^2}},$$

$$\alpha = 1 + \sqrt{1 - \left(\frac{x'}{R_x}\right)^2}$$

Thus, according to the illumination unit of the present embodiment the light beam from the light source 1 is reflected by or transmitted through the lens 3, first mirror 4 and second mirror 5 in order, and adjusted in the transverse cross section shape to illuminate the DMD 7.

Further, a not-shown optical tunnel adjuster is provided at the exit end of the optical tunnel 2. The optical tunnel adjuster is configured to tilt the exit end along the long sides or short sides of the rectangular opening of the optical tunnel 2, as indicated by arrows 105 and 106 in FIG. 3. Thus, it can adjust the orientation of the light beam emitted from the optical tunnel 2 to the DMD 7.

The cover glass 6 is provided at the front of the DMD 7. The DMD 7 is arranged approximately on a horizontal plane. When micromirrors of the DMD 7 are ON, the DMD 7 reflects the light from the second mirror 5 upward in vertical direction.

The exit end of the optical tunnel 2 and the surface of the DMD 7 on which the micromirrors are arranged are approximately conjugated with the illumination unit comprising the lens 3, first mirror 4, and second mirror 5.

By such arrangement a uniform light beam from the exit end of the optical tunnel 2 evenly illuminates the micromirrors on the DMD 7. Further, the light beam is three-dimensionally reflected several times from the lens 3 to the projection system 8 through the first and second mirrors 4, 5 and DMD 7.

The first and second mirrors 4, 5 are inclined relative to the x-axis and y-axis about the optical axis of the projection system 8 for the purpose of preventing the light beam from being interfered with the optical elements from the lens 3 to the projection system 8.

Table 1 shows the specifications of the optical elements of the illumination system from the light source 1 to the DMD 7. Table 2 shows the position coordinates of the optical elements of the illumination system.

TABLE 1

| light source 1 | converging angle (maximum) | 59.5° | |
|---|---|---|---|
| optical tunnel 2 | opening size | 5.5 × 3.9 mm | |
| | length | 25 mm | |
| lens 3* | curvature radius at incidence $R_1$ | 16.10 mm | incidence surface: spherical |
| | curvature radius at exit $R_2$ | −13.93 mm | exit surface: aspheric |
| | aspheric coefficient $c_{04}$ | −3.3561.E−04 | |
| | aspheric coefficient $c_{06}$ | 1.9823.E−05 | |
| | aspheric coefficient $c_{08}$ | −3.5536.E−07 | |
| | aspheric coefficient $c_{10}$ | 2.2548.E−09 | |

TABLE 1-continued

|  |  |  |  |
|---|---|---|---|
|  | aspheric coefficient $c_{12}$ | 5.2806.E−14 |  |
|  | center thickness | 13 mm |  |
|  | refractive index nd | 1.6779 |  |
|  | Abbe number vd | 54.9 |  |
| first mirror 4 | curvature radius R | ∞ | planar reflective surface: silver coating |
| second mirror 5 | curvature radius Rx | 70.0 mm | spherical surface (concave) |
|  | curvature radius Ry | 79.3 mm | reflective surface: silver coating |
| cover glass 6 | curvature radius R | ∞ | planar |
|  | center thickness | 1.05 mm |  |
|  | refractive index nd | 1.5168 |  |
|  | Abbe number vd | 64.1 |  |
| DMD 7 | size (long side) | 13.824 mm | pixel size: □10 μm |
|  | size (short side) | 8.64 mm |  |
|  | number of pixels (long side) | 1280 |  |
|  | number of pixels (short side) | 800 |  |
|  | pixel pitch | 10.8 μm |  |

*The aspheric coefficients other than the above are all zero.

TABLE 2

|  |  |  |
|---|---|---|
| optical tunnel 2 | x | −8.872 |
| (opening center at exit end) | y | 19.032 |
|  | z | −31.001 |
|  | α | 0.000 |
|  | β | 0.000 |
|  | γ | 26.134 |
| lens 3 | x | −8.801 |
| (vertex of incidence surface) | y | 19.039 |
|  | z | −23.892 |
| first mirror 4 | x | −8.925 |
|  | y | 21.140 |
|  | z | 22.093 |
|  | α | −27.059 |
|  | β | −11.999 |
|  | γ | 22.109 |
| second mirror 5 | x | −16.228 |
| (vertex of reflective surface) | y | 35.011 |
|  | z | 10.842 |
|  | α | 98.281 |
|  | β | 24.547 |
|  | γ | −92.007 |
| cover glass 6 | x | 0 |
| (center of DMD) | y | 0.660 |
|  | z | 0 |
| DMD 7 | x | 0 |
| (at center) | y | 0 |
|  | z | 0 |

Notes:
The units of x, y, z are [mm] and those of α, β, γ are degrees.
α, β, γ are rotations about x-axis, y-axis, z-axis, respectively.
Rotations occurred in the order of α, β, γ.
Clockwise α and β rotations are negative and clockwise γ rotation is positive.
Lenses 1 and 2 are not rotated.

Figure 7:
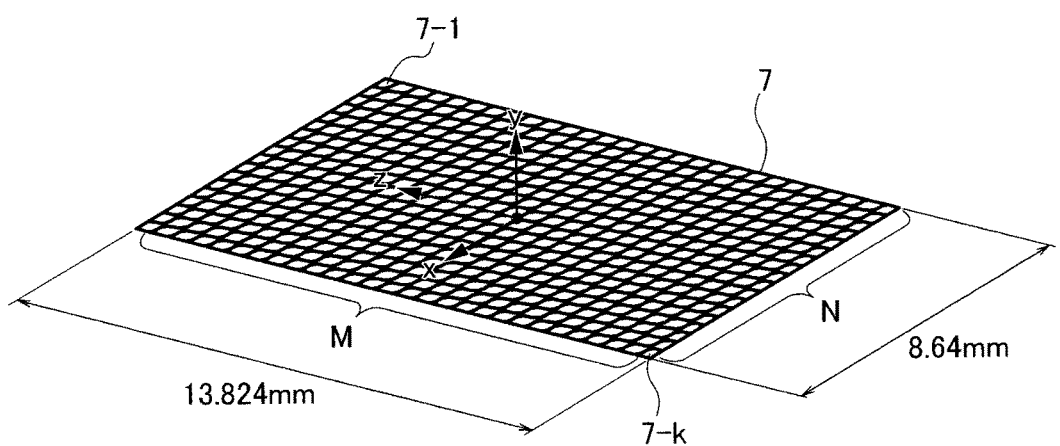
FIG. 7 is a perspective view of a DMD of the image display device.

Next, the structure of the DMD 7 is described. FIG. 7 is a perspective view of the DMD 7. It includes micromirrors 7-1 to 7-k two-dimensionally arranged on the surface. The DMD 7 corresponds to an optical modulator.

The tilts of the micromirrors 7-1 to 7-k are independently varied so as to be able to change the reflection angle of a light beam incident from a certain direction at a certain angle. Thereby, they can be placed in ON state and OFF state. Herein, the deflection angle of the micromirrors 7-1 to 7-k is about ±12 degrees.

When they are ON, the reflected light by the micromirrors is projected to the subsequent projection system 8 while when they are OFF, the reflected light thereby travels away from the projection system 8.

The number M of the micromirrors 7-1 to 7-k along the long side is 1,280 (13.824 mm) and the number N thereof along the short side is 800 (8.64 mm). The total number k thereof is M×N=1,024,000. The aspect ratio of the DMD 7 is 1280:800=16:10. The interval or pixel pitch among the micromirrors 7-1 to 7-k is 10.8 μm.

The micromirrors 7-1 to 7-k in ON state reflect the light beam from the second mirror 5 to the projection system 8. The projection system 8 projects the light beam onto the projection plane 101 placed in parallel to a plane including the y-axis and z-axis. Here, the size of an image projected on the projection plane 101 is 80 inches at a maximum.

Next, the structure of the projection system 8 of the image display device 100 is described. The projection system 8 comprises the lens system 81, lens barrel 10, first projection mirror 84, second projection mirror 85, and planar glass 9 to project an image formed on the DMD7 onto the projection plane 101.

The lens system 81 comprises 11 lenses, first lens 811 at an incidence end to eleventh lens 821 at an exit end. The optical axis of the lens system 81 is along the vertical y-axis and the projection plane 101 is placed to be parallel to the optical axis of the lens system 81.

Table 3 shows specific data on the lens system 81.

TABLE 3

| face No. | R | d | nd | vd |  |
|---|---|---|---|---|---|
| 1 | 19.964 | 4.024 | 1.5176 | 63.5 | lens 811 |
| 2 | −194.535 | 0.223 |  |  | lens 811 |
| 3 | 57.339 | 1.949 | 1.8830 | 40.8 | lens 812 |
| 4 | 12.164 | 6.389 | 1.4875 | 70.4 | lens 813 |
| 5 | −20.746 | 0.333 |  |  | lens 813 |
| 6 | −59.627 | 7.841 | 1.7306 | 37.6 | lens 814 |
| 7 | 49.429 | 0.605 |  |  | lens 814 |
| 8 | 19.401 | 6.781 | 1.5810 | 40.9 | lens 815 |
| 9 | −16.196 | 2.210 | 1.9040 | 31.3 | lens 816 |
| 10 | −29.57 | 6.866 |  |  | lens 816 |
| 11 | −154.02 | 1.822 | 1.5022 | 68.8 | lens 817 |
| 12 | 27.678 | 0.300 |  |  | lens 817 |
| 13 | 16.284 | 4.695 | 1.7068 | 29.8 | lens 818 |
| 14 | −53.869 | 1.663 |  |  | lens 818 |
| 15 | −26.356 | 1.800 | 1.9040 | 31.3 | lens 819 |
| 16 | 16.351 | 3.289 |  |  | lens 819 |
| 17 | −20.191 | 1.800 | 1.5316 | 55.8 | lens 820 |
| 18 | −31.084 | 8.111 |  |  | lens 820 |
| 19 | −16.01 | 4.125 | 1.5316 | 55.8 | lens 821 |
| 20 | −14.27 |  |  |  | lens 821 |

In Table 3 R is a curvature radius of a lens face in question, d is an interval between adjacent lens faces, and nd is a refraction index of each lens relative to a D-line and vd is an Abbe number of each lens. Both surfaces of the lenses 811, 820, and 821 are aspheric surfaces.

Table 4 shows the aspheric coefficients of the first, tenth, and eleventh lenses 811, 820, and 821. The shapes of the aspheric surfaces thereof are represented by the above-described Expression 1 and the aspheric coefficients in Table 4.

TABLE 4

| lens 811 | aspheric coefficient $c_{04}$ | 6.750330E−05 |
|---|---|---|
|  | aspheric coefficient $c_{06}$ | 2.106239E−07 |
|  | aspheric coefficient $c_{08}$ | 4.589854E−09 |
|  | aspheric coefficient $c_{10}$ | −2.480613E−11 |
|  | aspheric coefficient $c_{12}$ | −1.914714E−13 |
|  | aspheric coefficient $c_{14}$ | 7.962944E−15 |
|  | aspheric coefficient $c_{16}$ | 9.765820E−18 |
|  | aspheric coefficient $c_{04}$ | 8.850207E−05 |
|  | aspheric coefficient $c_{06}$ | 2.599021E−07 |
|  | aspheric coefficient $c_{08}$ | 2.928829E−09 |
|  | aspheric coefficient $c_{10}$ | 3.664243E−11 |
|  | aspheric coefficient $c_{12}$ | −1.018063E−12 |
|  | aspheric coefficient $c_{14}$ | 1.012708E−14 |
|  | aspheric coefficient $c_{16}$ | 9.188785E−17 |
| lens 820 | aspheric coefficient $c_{04}$ | 1.291913E−04 |
|  | aspheric coefficient $c_{06}$ | 2.804087E−06 |
|  | aspheric coefficient $c_{08}$ | −1.168735E−07 |
|  | aspheric coefficient $c_{10}$ | 2.477830E−09 |
|  | aspheric coefficient $c_{12}$ | −2.811971E−11 |
|  | aspheric coefficient $c_{14}$ | 1.571829E−13 |
|  | aspheric coefficient $c_{16}$ | −3.346058E−16 |
|  | aspheric coefficient $c_{04}$ | 8.369424E−05 |
|  | aspheric coefficient $c_{06}$ | 2.805544E−07 |
|  | aspheric coefficient $c_{08}$ | −1.645944E−08 |
|  | aspheric coefficient $c_{10}$ | 2.012555E−10 |
|  | aspheric coefficient $c_{12}$ | −6.351043E−13 |
|  | aspheric coefficient $c_{14}$ | −5.562187E−15 |
|  | aspheric coefficient $c_{16}$ | 1.413619E−17 |
| lens 821 | aspheric coefficient $c_{04}$ | 1.720445E−05 |
|  | aspheric coefficient $c_{06}$ | −1.048542E−06 |
|  | aspheric coefficient $c_{08}$ | 8.610665E−09 |
|  | aspheric coefficient $c_{10}$ | −1.738139E−11 |
|  | aspheric coefficient $c_{12}$ | −7.253682E−14 |
|  | aspheric coefficient $c_{14}$ | −2.849886E−17 |
|  | aspheric coefficient $c_{16}$ | 2.269214E−18 |
|  | aspheric coefficient $c_{04}$ | 2.595314E−05 |
|  | aspheric coefficient $c_{06}$ | −6.354212E−07 |
|  | aspheric coefficient $c_{08}$ | 1.020103E−08 |
|  | aspheric coefficient $c_{10}$ | −1.317664E−10 |
|  | aspheric coefficient $c_{12}$ | 1.166266E−12 |
|  | aspheric coefficient $c_{14}$ | −5.476703E−15 |
|  | aspheric coefficient $c_{16}$ | 1.077343E−17 |

The first projection mirror 84 reflects the light beam from the lens system 81 to the second projection mirror 85.

Figure 8:
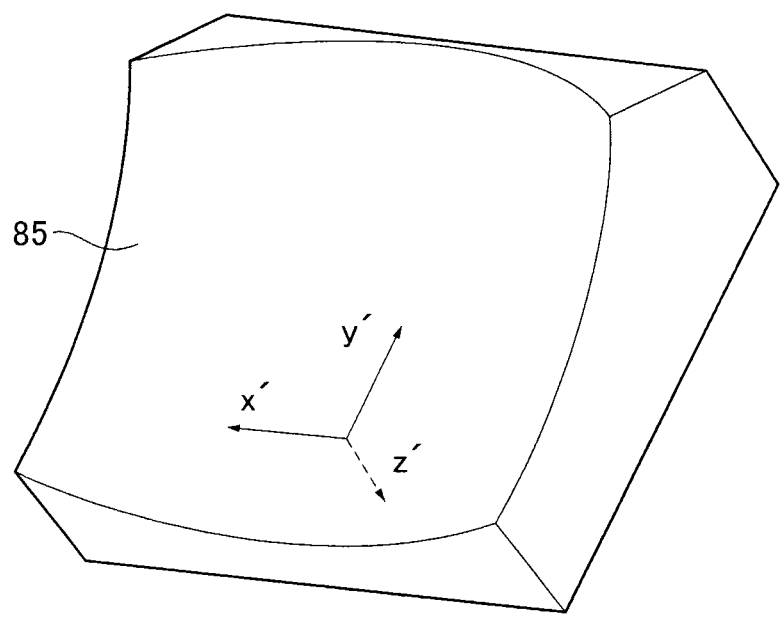
FIG. 8 is a perspective view of a second projection mirror of a projection system of the image display device.
Figure 8:
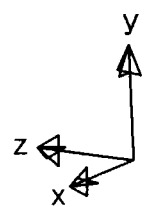

FIG. 8 is a perspective view of the second projection mirror 85 of the image display device 100. The reflective surface of the second projection mirror 85 is a free-form surface so as to correct vertical and horizontal distortion of an image projected on the projection plane 101.

Table 5 shows the aspheric coefficients of the reflective surface of the second projection mirror 85. The reflective surface of the second projection mirror 85 is an aspheric surface represented by the following Expression 3 and the aspheric coefficients in Table 5 in the local coordinate system (x'y'z') in FIG. 6.

$$z'(x', y') = \frac{cr^2}{1 + \sqrt{1 - c^2 r^2}} + \sum_k \sum_{k,j} c_{k,j} (x')^k (y')^j,$$

$$c = \frac{1}{R}, r = \sqrt{(x')^2 + (y')^2}$$

Expression 3

TABLE 5

| | curvature radius R | ∞ (planar) |
|---|---|---|
| projection mirror 85 | aspheric coefficient $c_{2,0}$ | 5.861336E−03 |
|  | aspheric coefficient $c_{0,2}$ | 2.299409E−03 |
|  | aspheric coefficient $c_{2,1}$ | 3.447998E−05 |
|  | aspheric coefficient $c_{0,3}$ | 3.902694E−06 |
|  | aspheric coefficient $c_{4,0}$ | 2.031034E−07 |
|  | aspheric coefficient $c_{2,2}$ | 4.709163E−07 |
|  | aspheric coefficient $c_{0,4}$ | 7.126801E−08 |
|  | aspheric coefficient $c_{4,1}$ | 4.007452E−09 |
|  | aspheric coefficient $c_{2,3}$ | 5.067003E−09 |
|  | aspheric coefficient $c_{0,5}$ | −1.490065E−09 |
|  | aspheric coefficient $c_{6,0}$ | −1.195799E−10 |
|  | aspheric coefficient $c_{4,2}$ | 1.211113E−11 |
|  | aspheric coefficient $c_{2,4}$ | −8.261563E−11 |
|  | aspheric coefficient $c_{0,6}$ | 1.615799E−10 |
|  | aspheric coefficient $c_{6,1}$ | −4.124172E−12 |
|  | aspheric coefficient $c_{4,3}$ | −1.810118E−12 |
|  | aspheric coefficient $c_{2,5}$ | 3.618342E−12 |
|  | aspheric coefficient $c_{0,7}$ | −3.759000E−12 |
|  | aspheric coefficient $c_{8,0}$ | 1.030317E−13 |
|  | aspheric coefficient $c_{6,2}$ | −3.644868E−14 |
|  | aspheric coefficient $c_{4,4}$ | 1.388509E−13 |
|  | aspheric coefficient $c_{2,6}$ | −2.148588E−14 |
|  | aspheric coefficient $c_{0,8}$ | −4.698124E−14 |
|  | aspheric coefficient $c_{8,1}$ | 3.085129E−15 |
|  | aspheric coefficient $c_{6,3}$ | 2.856688E−15 |
|  | aspheric coefficient $c_{4,5}$ | −1.090944E−15 |
|  | aspheric coefficient $c_{2,7}$ | 3.429217E−15 |
|  | aspheric coefficient $c_{0,9}$ | 2.390548E−15 |
|  | aspheric coefficient $c_{10,0}$ | −4.894122E−17 |
|  | aspheric coefficient $c_{8,2}$ | 5.872508E−17 |
|  | aspheric coefficient $c_{6,4}$ | −1.117660E−17 |
|  | aspheric coefficient $c_{4,6}$ | −2.225495E−16 |
|  | aspheric coefficient $c_{2,8}$ | 5.642092E−18 |
|  | aspheric coefficient $c_{0,10}$ | 1.647124E−17 |
|  | aspheric coefficient $c_{10,1}$ | −1.051485E−18 |
|  | aspheric coefficient $c_{8,3}$ | −2.407368E−18 |
|  | aspheric coefficient $c_{6,5}$ | −9.526972E−19 |
|  | aspheric coefficient $c_{4,7}$ | 3.675664E−18 |
|  | aspheric coefficient $c_{2,9}$ | −5.348885E−18 |
|  | aspheric coefficient $c_{0,11}$ | −8.796724E−19 |
|  | aspheric coefficient $c_{12,0}$ | 1.280434E−20 |
|  | aspheric coefficient $c_{10,2}$ | −3.018432E−20 |
|  | aspheric coefficient $c_{8,4}$ | −2.294161E−20 |
|  | aspheric coefficient $c_{6,6}$ | 1.615774E−19 |
|  | aspheric coefficient $c_{4,8}$ | 2.693197E−21 |
|  | aspheric coefficient $c_{2,10}$ | 9.864725E−20 |
|  | aspheric coefficient $c_{0,12}$ | −8.337776E−21 |
|  | aspheric coefficient $c_{12,1}$ | 1.485311E−22 |
|  | aspheric coefficient $c_{10,3}$ | 1.098791E−21 |
|  | aspheric coefficient $c_{8,5}$ | 5.367361E−22 |
|  | aspheric coefficient $c_{6,7}$ | −3.052206E−21 |
|  | aspheric coefficient $c_{4,9}$ | 1.632099E−21 |
|  | aspheric coefficient $c_{2,11}$ | 2.499589E−22 |
|  | aspheric coefficient $c_{0,13}$ | 4.076615E−22 |
|  | aspheric coefficient $c_{14,0}$ | −1.423270E−24 |
|  | aspheric coefficient $c_{12,2}$ | 5.605448E−24 |
|  | aspheric coefficient $c_{10,4}$ | 4.172579E−24 |
|  | aspheric coefficient $c_{8,6}$ | −2.701329E−23 |
|  | aspheric coefficient $c_{6,8}$ | 1.125683E−24 |
|  | aspheric coefficient $c_{4,10}$ | −4.987119E−23 |
|  | aspheric coefficient $c_{2,12}$ | −1.758726E−23 |
|  | aspheric coefficient $c_{0,14}$ | −3.613684E−24 |
|  | aspheric coefficient $c_{14,1}$ | −4.066279E−27 |
|  | aspheric coefficient $c_{12,3}$ | −1.931199E−25 |
|  | aspheric coefficient $c_{10,5}$ | 3.002305E−27 |
|  | aspheric coefficient $c_{8,7}$ | 3.511542E−25 |
|  | aspheric coefficient $c_{6,9}$ | 1.893875E−25 |
|  | aspheric coefficient $c_{4,11}$ | 3.499850E−25 |
|  | aspheric coefficient $c_{2,13}$ | 1.054943E−25 |
|  | aspheric coefficient $c_{0,15}$ | 8.602497E−27 |

Further, Table 6 shows the specifications of the optical elements of the projection system 8 excluding the lens system 81 and second projection mirror 85. Note that diaphragms 1 to 3 in the table are not shown in FIGS. 3 and 4.

TABLE 6

| projection mirror 84 | curvature radius R | ∞ (planar) |
|---|---|---|
| planar glass 9 | curvature radius R | ∞ (planar) |
|  | center thickness | 3.00 mm |
|  | nd | 1.5168 |
|  | νd | 64.2 |
| diaphragm 1 | aperture diameter | 15.6 mm |
| diaphragm 2 | aperture diameter | 14.8 mm |
| diaphragm 3 | aperture diameter | 18.2 mm |

Table 7 shows the coordinates of the optical elements of the projection system 8 when the screen size projected on the projection plane 101 is 43 inches.

TABLE 7

| lens 811 | x | 6.340 |
|---|---|---|
| (vertex of incidence surface) | y | 44.160 |
|  | z | 0 |
| mirror 84 | x | 6.340 |
| (reflective surface) | y | 170.569 |
|  | z | 0 |
|  | α | 0 |
|  | β | −90 |
|  | γ | 45 |
| mirror 85 | x | −48.660 |
| (local coordinate origin | y | 105.269 |
| of reflective surface) | z | 0 |
|  | α | −90 |
|  | β | 39.7 |
|  | γ | 90 |
| planar glass 9 | x | −48.660 |
|  | y | 173.569 |
|  | z | 0 |
| projection plane 101 | x | 136 |
|  | y | 595 |
|  | z | 0 |
|  | α | 0 |
|  | β | −90 |
|  | γ | 0 |
| diaphragm 1 | x | 6.340 |
|  | y | 48.184 |
|  | z | 0 |
| diaphragm 2 | x | 6.340 |
|  | y | 81.382 |
|  | z | 0 |
| diaphragm 3 | x | 6.340 |
|  | y | 83.504 |
|  | z | 0 |

Notes:
The units of x, y, z are [mm] and those of α, β, γ are degrees.
α, β, γ are rotations about x-axis, y-axis, z-axis, respectively.
Rotations occurred in the order of α, β, γ.
Clockwise α and β rotations are negative and clockwise γ rotation is positive.
α = 90 and β = γ = 0 for lenses 811 and 821 and planar plate 9.

The image display device 100 is placed below the bottom end of the projection plane 101 to project a light beam obliquely upward to the projection plane 101.

The planar glass 9 is disposed close to the top ends of the first and second projection mirrors 84, 85 and parallel to a plane including the x-axis and z-axis. The planar glass 9 is fitted into an opening at the top of a not-shown housing of the image display device 100 for the purpose of dust proofing inside the device 100.

Next, the structure and effects of the second mirror 5 is described.

To improve the optical use efficiency of the image display device, it is effective to increase the opening size of the optical tunnel, thereby reducing a loss of the optical tunnel coupling and improving efficiency thereof.

In view of this, the image display device 100 according to the present embodiment uses the second mirror 5 having the reflective surface which is anamorphic and toroidal. The curvature radiuses of the toroidal surface are set to satisfy the relation, |Ry|>|Rx| so that the short sides of the DMD projection beam are decreased.

Having the toroidal surface with the above curvature radiuses, the second mirror 5 exerts increased optical power on the short sides of the illumination on the DMD 7 so that the short sides of the DMD projection beam can be decreased in size. That is, with the second mirror 5, it is possible to enlarge the size of the short sides of the opening of the optical tunnel 2 to secure a margin of adjusting the positions of the DMD projection beam.

Generally, in terms of an illumination system in which optical elements such as lenses or mirrors are eccentrically arranged in a three-dimensional space, the shape of an image formed on a DMD is distorted from a rectangular shape of an optical tunnel even if the opening of the optical tunnel is perfectly rectangular.

Specifically, assumed that a light beam is emitted from the points of the four corner of the opening of the exit end 22 of the optical tunnel 2 and collected at four points P1 to P4 on a virtual plane placed at y=0 in parallel to the xz plane. That is, the light-colleting points P1 to P4 are at barycentric coordinate positions of the light beams from each point of the four corners of the opening of the optical tunnel 2 on a virtual plane.

Figure 9:
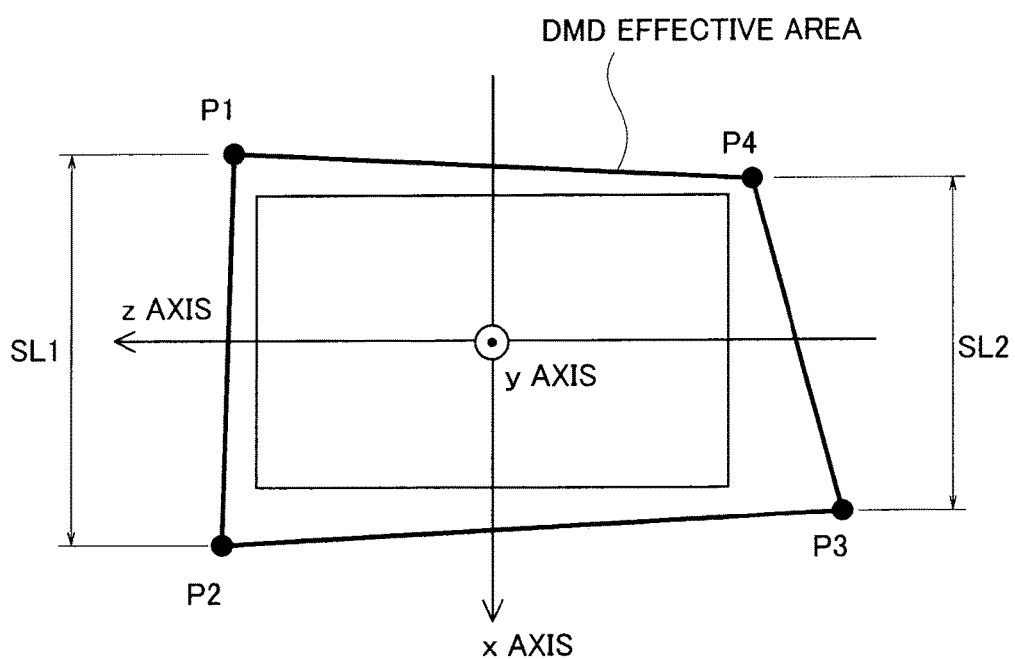
FIG. 9 shows a relationship between the effective area of the DMD and an illumination area of a light beam irradiated from the top of an optical tunnel opening.

FIG. 9 shows the relationship between the effective area of the DMD 7 and the illumination area of the light beams from the opening vertexes of the optical tunnel 2. As shown therein, a distorted rectangular is formed by virtually connecting the light-collecting points P1 to P4.

Here, distances along the x-axis between two short sides of the quadrangular formed by the points P1 to P4 are defined to be SL1 and SL2 in FIG. 9 and the mean value thereof is defined to be SL.

Further, the rotational angle γ of the second mirror 5 about the z'-axis (FIG. 8) is set in the position or in the vicinity of the position such that the mean value SL becomes minimal. The z'-axis is a normal line from the vertex of the toroidal surface.

Figure 10:
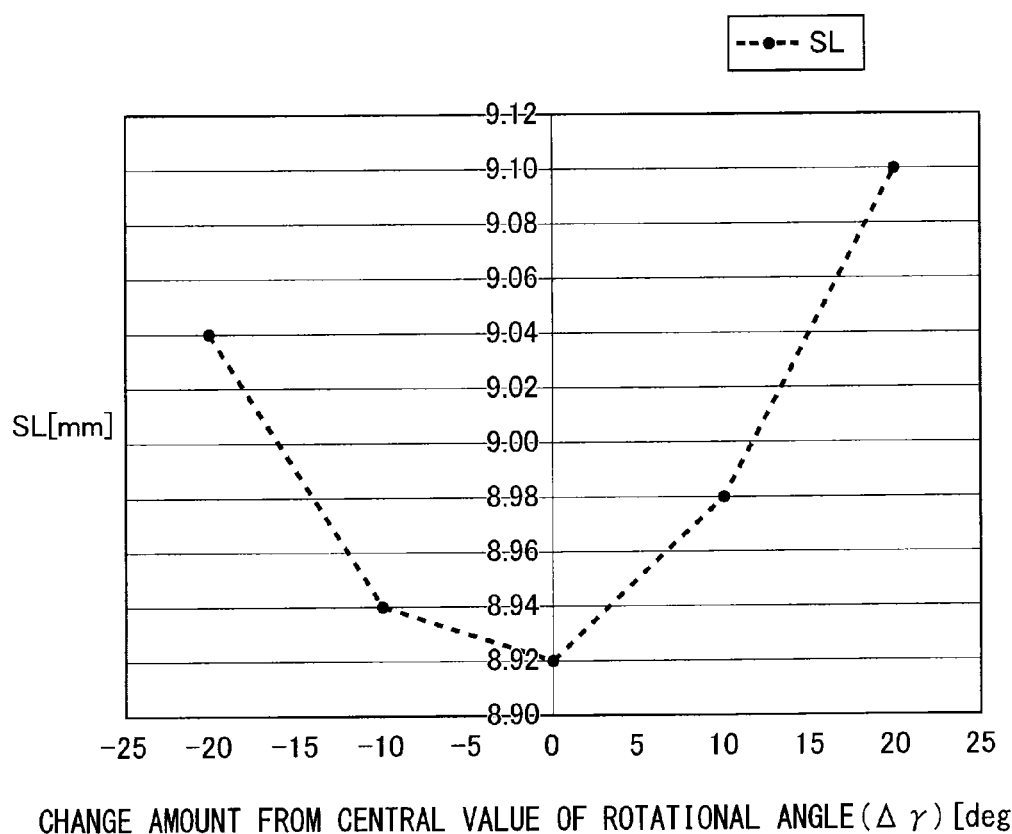
FIG. 10 is a graph showing a relationship between a rotational angle of the second mirror and a mean value of distances along an x-axis between coordinates of two opposing short side of a quadrangular illumination area of a light beam from the vertexes of the optical tunnel opening.

FIG. 10 is a graph showing a relationship between the rotational angle of the second mirror 5 and the mean value SL of the distances along the x-axis between coordinates of two opposing short sides of a quadrangular illumination area of a light beam from the vertexes of the opening of the optical tunnel 2. The graph shows the relationship between the mean value SL and a change amount of the rotational angle γ of the toroidal surface from a design value, that is, −92.007 degree in Table 2, and the mean value SL is minimal at the design value.

As described above, according to the image display device 100 the rotational angle γ can be set to a value so that the size of the short sides of the DMD projection beam can be decreased most. Thus, the short sides of the opening of the optical tunnel 2 can be enlarged, making it possible to improve the optical use efficiency.

Note that in image display device 100 the long sides of the optical tunnel 2 do not vary in size, and the long sides of the DMD projection beam are nearly unchanged in size accordingly.

Figure 11:
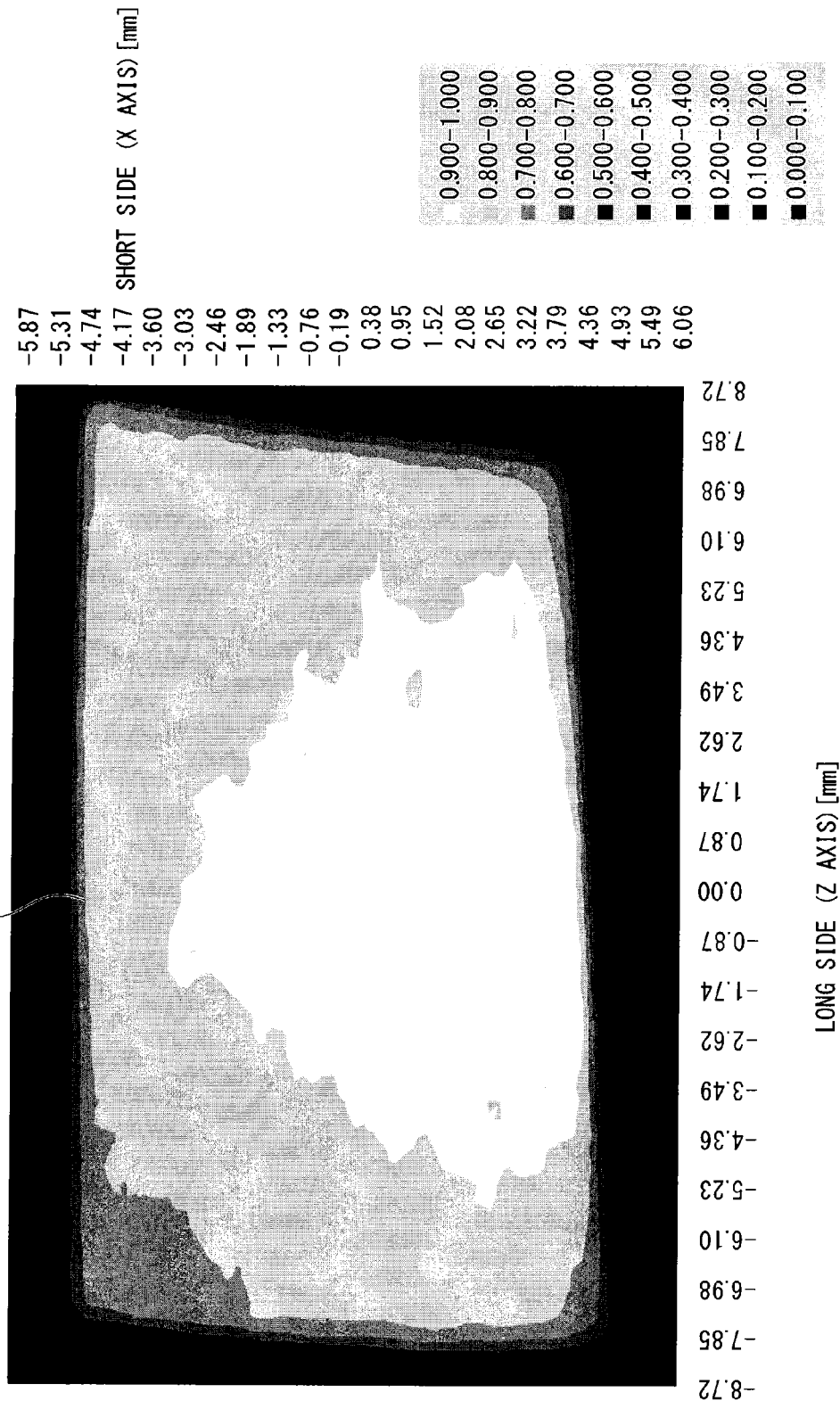
FIG. 11 shows the illuminance distribution on the DMD calculated by light beam tracking.

FIG. 11 is a graph showing the illuminance distribution on the DMD 7 calculated by light beam tracking as a result of simulation. In the drawing the area surrounded by the black line is the effective area of the DMD 7. The illuminance distribution is standardized with the maximal illuminance of the area set to 1.0 or 100%.

In the simulation LightTools® manufactured by Ora Inc. U.S.A. was used. Also, a high-pressure mercury lamp, UHP 240-190 W 0.8 E20.9 Fusion Star manufactured by Philips International was used for a light source.

As seen from FIG. 11, the mean value of ANSI (American National Standards Institute) at 9 points of the effective area 17 is 90.2%. That is, the illuminance distribution of the effective area 17 is uniform. Note that ANSI at 9 points refers to the illuminance of the center of each of nine equally divided areas of the effective area 17.

Now, the optical use efficiency of the image display device 100 is described. The optical use efficiency thereof from the light emission from the light source 1 to the light projection from the projection system is defined to be η1.

For the purpose of comparison, the second mirror 5 having a spherical surface with the maximal curvature radius (Ry=79.3 mm in Table 1) in place of the toroidal surface is used by way of example. The size of the short sides of the optical tunnel 2 are then set to a value (2.62 mm) so that the mean value SL is same (8.92 mm) as that of the image display device 100. The optical use efficiency of this example is defined to be η2.

The ratio of their optical use efficiencies is found to be η1/η2=1.084. That is, >η2.

Thus, the image display device 100 can improve the optical use efficiency by 8.4% from the comparison example comprising an illumination system including the second mirror with a spherical surface and emitting a DMD projection beam of the same size.

Accordingly, the size of the optical tunnel 2 corresponding to the short sides of the DMD 7 can be increased, thereby enhancing the optical use efficiency.

According to the present embodiment the illumination system with a simpler structure than one having a lens immediately before an optical modulator can be realized.

Further, according to the present embodiment the illumination system can be made of only the second mirror 5 with an anamorphic surface and disposed after the lens 3. Thereby, an illumination system of a simple structure can be achieved at a low cost.

Further, the toroidal surface of the second mirror 5 is of a simpler shape than that having a high-order extended aspheric coefficient. Because of this, it is able to shorten the time taken for inspecting a lens surface shape and reduce the manufacturing costs of optical components.

Further, according to the present embodiment the image display device 100 with a simple structure and a high optical use efficiency can be achieved since it comprises the projection system which projects images formed by the DMD 7 onto the projection plane 101.

Second Embodiment

First, an image display device 100A according to a second embodiment will be described.

Figure 12:
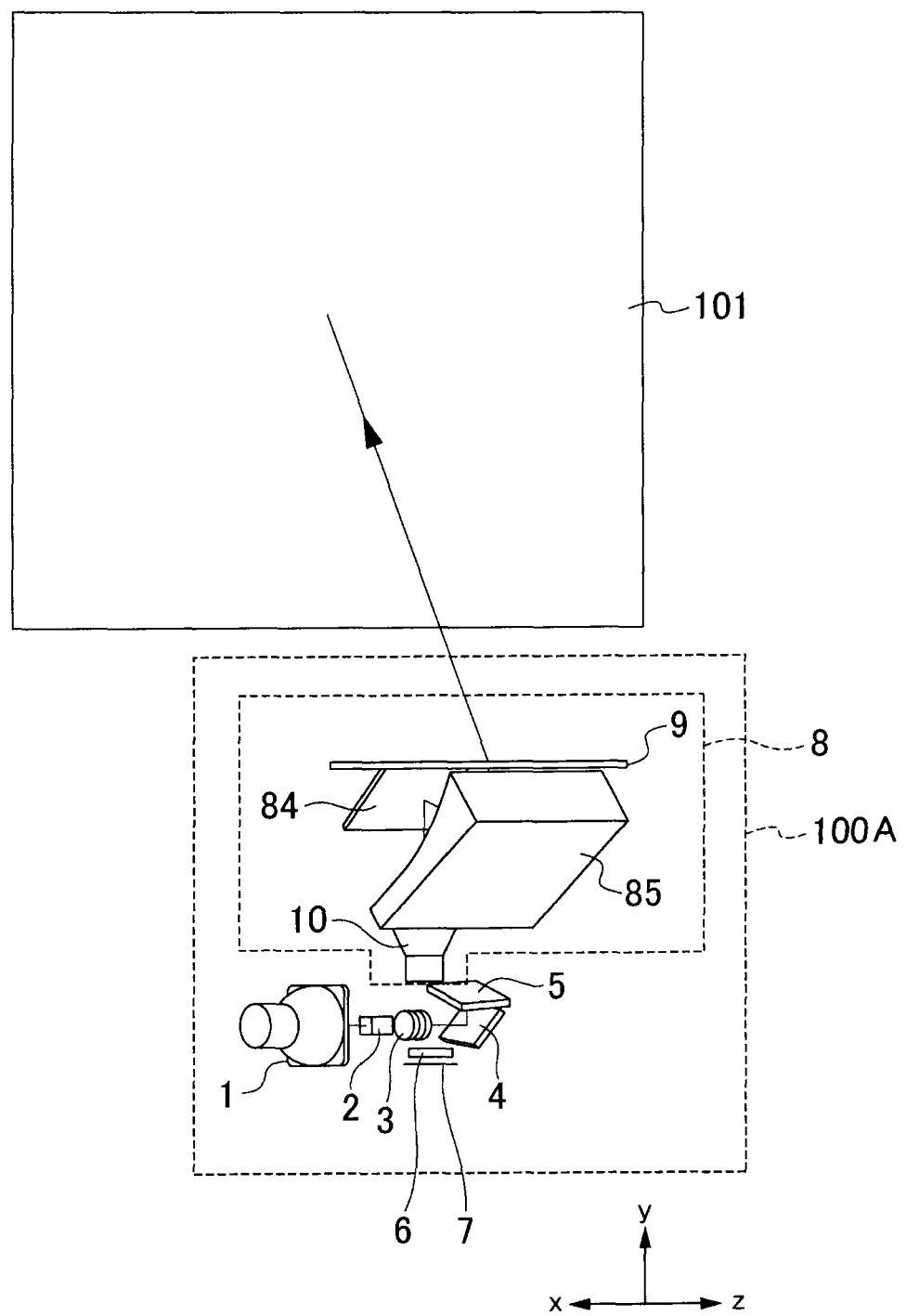
FIG. 12 schematically shows the positional relationship between an image display device according to a second embodiment and a projection plane.
Figure 13:
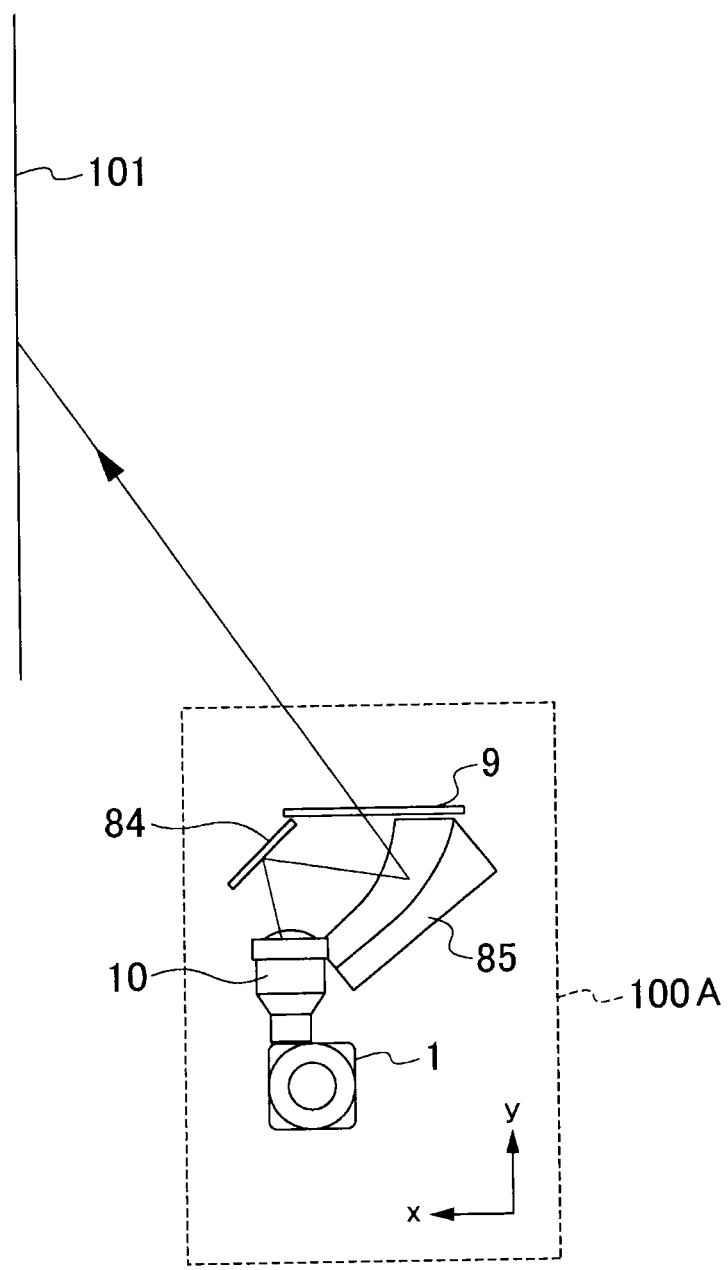
FIG. 13 is schematically shows the positional relationship between the image display device and the projection plane.

FIG. 12 and FIG. 13 schematically show the positional relationship between the image display device 100A and a projection plane 101. The image display device 100A projects an image on the projection plane 101, as shown in the drawing.

Herein, the projection plane 101 is a screen, for example.

Figure 14:
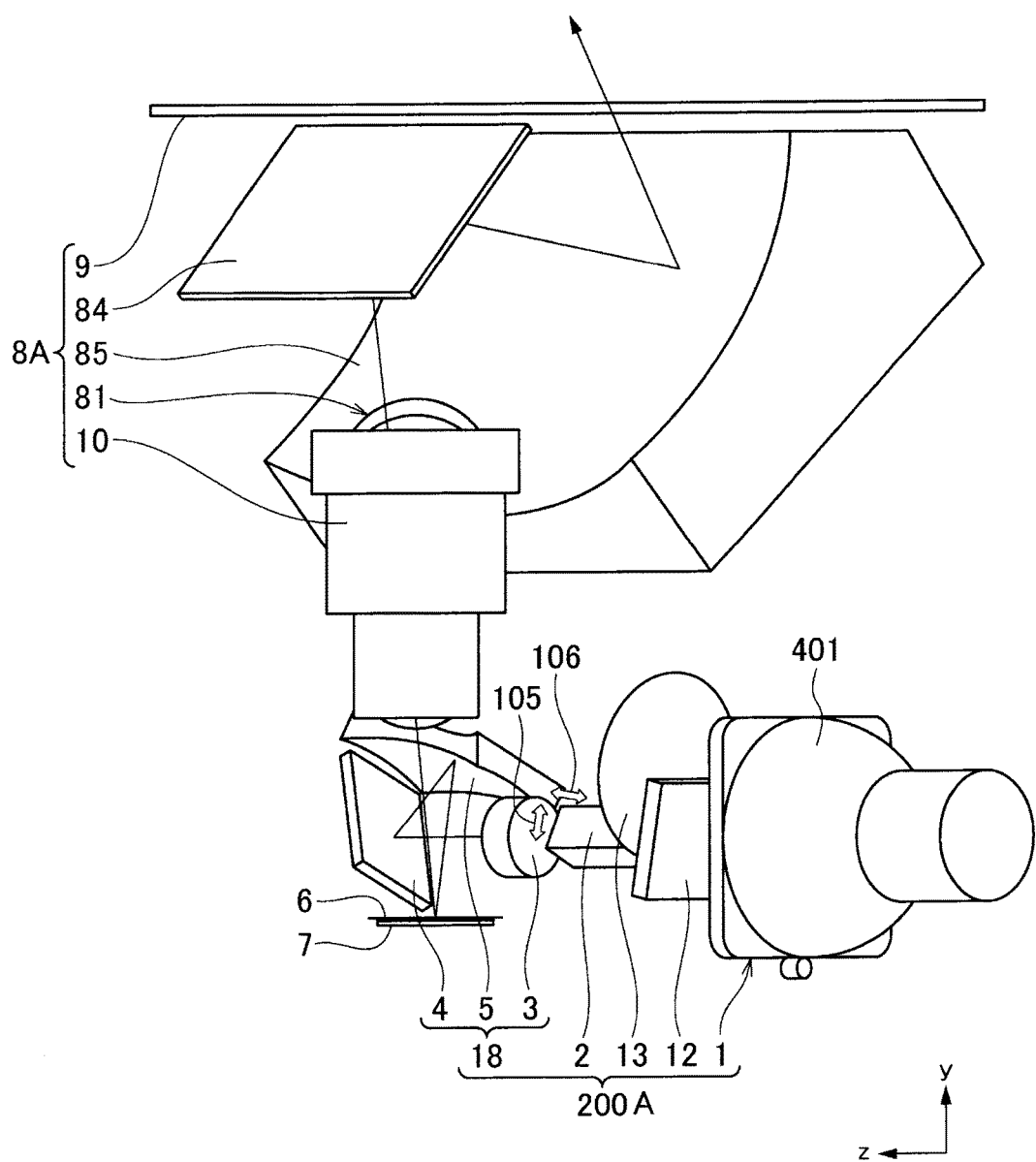
FIG. 14 schematically shows the structure of the image display device.

Next, the structure of the image display device 100A is described referring to FIG. 14.

FIG. 14 schematically shows the structure of the image display device 100A. The image display device 100A comprises an illumination unit 200A, a cover glass 6, a DMD 7, and a projection system 8A.

Note that in the following the origin O of an absolute coordinate system (xyz system) is defined to be the center of the DMD 7. X-axis is defined to be a direction along the short side of the surface of the DMD 7, z-axis is defined to be a direction along the long side thereof and orthogonal to the x-axis, and y-axis is defined to be a direction orthogonal to the x-axis and y-axis and the surface of the DMD 7. Further, the x-axis is parallel to the short side of the DMD 7 and the z-axis is parallel to the long side thereof.

Moreover, rotational angles around the x-axis, y-axis, and z-axis are set to be rotational angles α, β, γ, respectively and counterclockwise rotational angles α β are considered as positive and clockwise rotational angle γ is considered to be positive.

The structure of the illumination unit 200A is described. The illumination unit 200A emits a light beam to the DMD 7.

The illumination unit 200A comprises a light source 1, an optical tunnel 2, an explosion-proof glass 12, a color wheel 13, and an illumination system 18.

In FIG. 14 the light source 1 comprises a reflector 401 having a not-shown light emitter and a condenser mirror. The light emitter is a xenon lamp, mercury lamp, or metal halide lamp, for example. A not-shown lamp cover is provided at the front of the light source 1.

The illumination unit 200A forms an image of the light source from a light beam from the light source 1, using the condenser mirror. The optical axis of the light beam from the light source 1 is along the z-axis. The light source 1 is placed so that light distribution of the light beam is approximately rotationally symmetric and isotropic relative to the optical axis.

Figure 15:
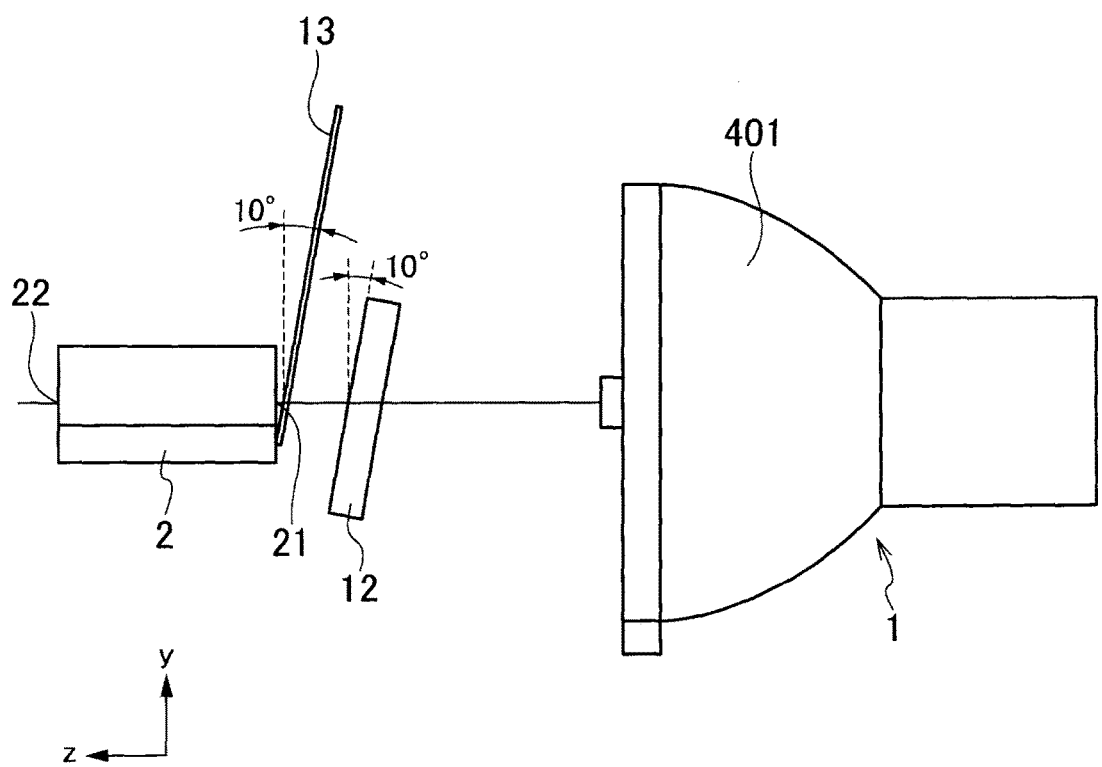
FIG. 15 schematically shows the structure of optical elements from a light source to an optical tunnel.

FIG. 15 schematically shows the structure of optical elements from the light source 1 to the optical tunnel 2. The explosion-proof glass 12 and color wheel 13 are disposed between the light source 1 and the optical tunnel 2 at a certain tilt angle (10 degrees, for example) relative to the optical axis of the light source 1 (z-axis direction in FIG. 15).

The color wheel 13 is a known optical filter having a ring portion divided into three corresponding to three primary colors, red (R), green (G), and blue (B). Alternatively, it can be an optical filter divided into four corresponding to red, green, blue, and white (W).

The light beam from the light source 1 crosses the ring portion of the color wheel 13 in rotation, time-divided into RGB or RGB and W color beams and is incident on the optical tunnel 2. Thus, the image display device 100A projects images corresponding to the optical color filters of the color wheel 13 onto the projection plane 101 and forms a color image thereon.

The optical tunnel 2 is an optical mixer formed as a rectangular tube of four mirror plates with mirror surfaces facing inward. Alternatively, the optical mixer can be a known rod integrator or a light pipe, for example.

The optical tunnel 2 includes a rectangular opening at incidence and exit ends 21 and 22 and is placed so that the incidence end 21 is positioned in the vicinity of the focal position behind the color wheel 13. Because of this, the light beam from the light source 1 is efficiently incident on the optical tunnel 2.

In the optical tunnel 2 the incident light is repeatedly reflected by the four mirrors provided inside to form images of secondary light sources from a light source image. The secondary light source refers to an image of a light source generated by the light source. Therefore, the optical tunnel 2 emits light having a rectangular transverse cross section with even illuminance distribution. The light distribution of the light from the optical tunnel 2 is approximately symmetric relative to the optical axis (z-axis) so that the light exited therefrom maintains isotropic property.

The exit end 22 is placed to be approximately conjugated with the micromirror groups of the DMD 7.

Further, a not-shown optical tunnel adjuster is provided at the exit end 22 of the optical tunnel 2.

The optical tunnel adjuster is configured to tilt the exit end 22 along the long sides or short sides of the rectangular opening, as indicated by arrows 105 and 106 in FIG. 14. Thus, it can adjust the orientation of the light beam emitted from the optical tunnel 2 to the DMD 7.

The illumination system 18 is placed on the optical path of the light beam from the optical tunnel 2.

Now, the structure of the illumination system 18 is described. The illumination system 18 illuminates the DMD 7 with the light beams from the secondary light sources formed by the optical tunnel 2.

The illumination system 18 comprises a lens 3, a first mirror 4, and a second mirror 5 arranged in this order on the optical path from the optical tunnel 2 to the DMD 7.

The lens 3 is approximately on the path of a traveling light beam from the optical tunnel 2. The lens 3 comprises a condenser lens with an aspheric surface on an exit side. This aspheric surface is represented defined by the following Expression 4, a later-described curvature radius, and an aspheric coefficient.

$$z'(x', y') = \frac{cr^2}{1 + \sqrt{1 - c^2 r^2}} + \sum_k c_{2k} r^{2k}, \qquad \text{Expression 4}$$

$$c = \frac{1}{R}, r = \sqrt{(x')^2 + (y')^2}$$

Alternatively, the lens 3 can comprise two or more lenses.

In Expression 4 "z" is represented by a local coordinate system x', y', z' with a vertex of each lens surface set to origin. That is, "z" is a sag amount of a lens surface.

The first mirror 4 is a planar mirror placed approximately on the path of a traveling light beam from the optical tunnel 2. The first mirror 4 is inclined relative to both of the x-axis and z-axis to reflect the light beam from the lens 3 to the second mirror 5.

The second mirror 5 is placed to reflect the reflected light from the first mirror 4 to the DMD 7. The second mirror 5 is inclined relative to both of the x-axis and z-axis.

Thus, the first mirror 4 and second mirror 5 are disposed immediately prior to an optical modulator in place of a lens, so that an illumination system of a simple structure can be realized.

Figure 16:
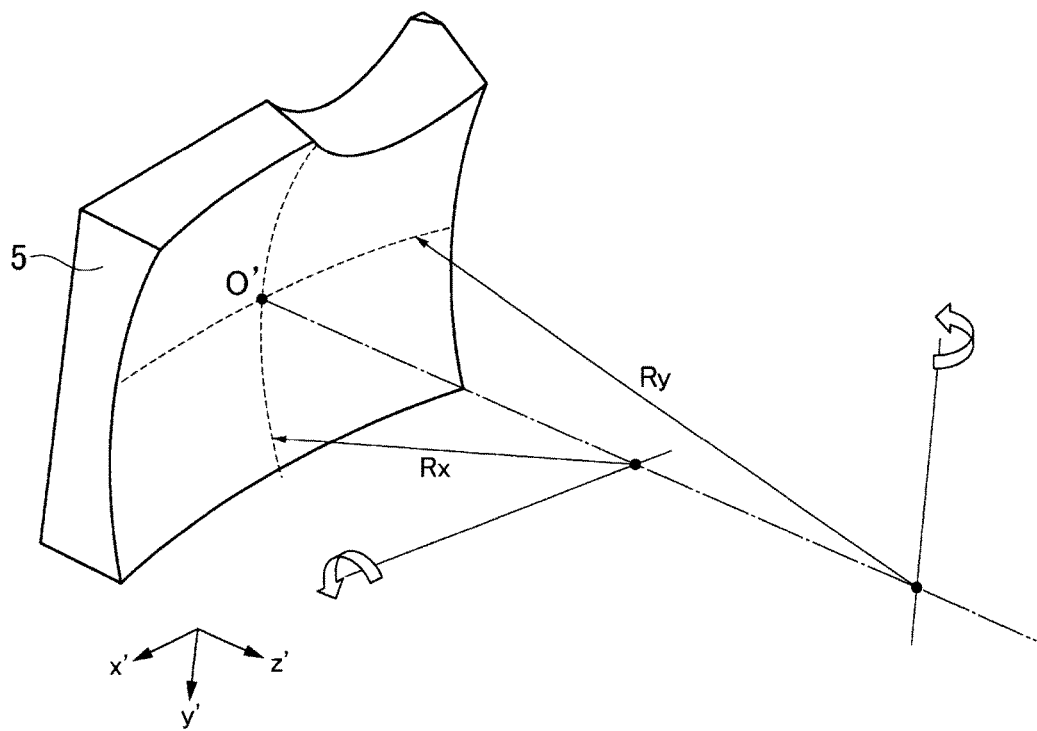
FIG. 16 is a perspective view of a second mirror of the image display device.

FIG. 16 is a perspective view of the second mirror 5. As shown in the drawing, the second mirror 5 has a reflective surface which is anamorphic and toroidal.

The toroidal surface is of a simpler shape than a surface with a high-order extended aspheric coefficient. Accordingly, it is possible to shorten the length of time taken for inspecting a surface shape of the second mirror 5 and reducing the manufacturing costs of parts and components.

The toroidal surface of the second mirror 5 is an aspheric surface defined by the following Expression 5 with the origin of the local coordinate system (x'y'z' system) set to O'. The aspheric surface is an x-toroidal, concave surface formed by rotating an arc around an axis parallel to the y'-axis with a curvature radius Ry=79.1 mm about an axis parallel to the x'-axis with a curvature radius Rx=68.7 mm.

$$z'(x', y') = \frac{\frac{2(x')^2}{\alpha R_x} - \frac{(x')^4}{\alpha^2 R_x^2 R_y} + \frac{(y')^2}{R_y}}{1 + \sqrt{\left\{1 - \frac{(x')^2}{\alpha R_x R_y}\right\}^2 - \left(\frac{y'}{R_y}\right)^2}}, \qquad \text{Expression 5}$$

$$\alpha = 1 + \sqrt{1 - \left(\frac{x'}{R_x}\right)^2}$$

Thus, the light beam from the light source 1 is projected onto the micromirror groups of the DMD 7 after the transverse cross section thereof is adjusted in shape by the illumination system 18.

Accordingly, with the provision of the illumination system 18, the even light beam from the exit end 22 of the optical tunnel 2 can be uniformly projected to the DMD 7.

The light beam from the lens 3 is three-dimensionally reflected several times, passing through the first and second mirrors 4, 5 and DMD 7 to the projection system 8A.

The first and second mirrors 4, 5 are inclined relative to the x-axis and y-axis about the optical axis of the projection system 8A for the purpose of preventing the light beam from being interfered with the optical elements from the lens 3 to the projection system 8A.

Table 8 shows the specifications of the optical elements of the illumination system 18 from the light source 1 to the DMD 7.

TABLE 8

| | | | |
|---|---|---|---|
| light source 1 | converging angle (maximum) | 59.5° | |
| optical tunnel 2 | opening size | 5.3 × 2.9 mm | |
| | length | 25 mm | |
| lens 3* | curvature radius at incidence $R_1$ | 16.18 mm | incidence surface: spherical |
| | curvature radius at exit $R_2$ | −14.00 mm | exit surface: aspheric |
| | aspheric coefficient $c_{04}$ | −3.3450.E−04 | |
| | aspheric coefficient $c_{06}$ | 1.9877.E−05 | |
| | aspheric coefficient $c_{08}$ | −3.5557.E−07 | |
| | aspheric coefficient $c_{10}$ | 2.2454.E−09 | |
| | aspheric coefficient $c_{12}$ | 1.2000.E−12 | |
| | center thickness | 13 mm | |
| | refractive index nd | 1.6779 | |
| | Abbe number vd | 54.9 | |
| first mirror 4 | curvature radius R | ∞ | planar reflective surface: silver coating |

TABLE 8-continued

| | | | |
|---|---|---|---|
| second mirror 5 | curvature radius Rx | 68.74 mm | spherical surface (concave) reflective surface: silver coating |
| | curvature radius Ry | 79.09 mm | |
| cover glass 6 | curvature radius R | ∞ | planar |
| | center thickness | 1.05 mm | |
| | refractive index nd | 1.5168 | |
| | Abbe number vd | 64.1 | |
| DMD 7 | size (long side) | 13.824 mm | pixel size : □10 μm |
| | size (short side) | 8.64 mm | |
| | number of pixels (long side) | 1280 | |
| | number of pixels (short side) | 800 | |
| | pixel pitch | 10.8 μm | |

*The aspheric coefficients other than the above are all zero.

Table 9 shows the position coordinates of the optical elements of the illumination system 18.

TABLE 9

| | | |
|---|---|---|
| optical tunnel 2 | x | −8.818 |
| (opening center at exit end) | y | 19.025 |
| | z | −30.897 |
| | α | 0.000 |
| | β | 0.000 |
| | γ | 26.130 |
| lens 3 | x | −8.825 |
| (vertex of incidence surface) | y | 19.047 |
| | z | −23.965 |
| first mirror 4 | x | −8.412 |
| | y | 20.633 |
| | z | 21.959 |
| | α | −27.103 |
| | β | −11.968 |
| | γ | 25.424 |
| second mirror 5 | x | −16.198 |
| (vertex of reflective surface) | y | 35.291 |
| | z | 10.871 |
| | α | 98.286 |
| | β | 24.660 |
| | γ | −81.310 |
| cover glass 6 | x | 0 |
| (center of DMD) | y | 0.660 |
| | z | 0 |
| DMD 7 | x | 0 |
| (at center) | y | 0 |
| | z | 0 |

Notes:
The units of x, y, z are [mm] and those of α, β, γ are degrees.
α, β, γ are rotations about x-axis, y-axis, z-axis, respectively.
Rotations occurred in the order of α, β, γ.
Clockwise α and β rotations are negative and clockwise γ rotation is positive.
Lenses 1 and 2 are not rotated.

The cover glass is disposed on the surface of the DMD 7 on which the micromirrors are mounted, to protect the DMD 7.

Next, the structure of the DMD 7 is described.

Figure 17:
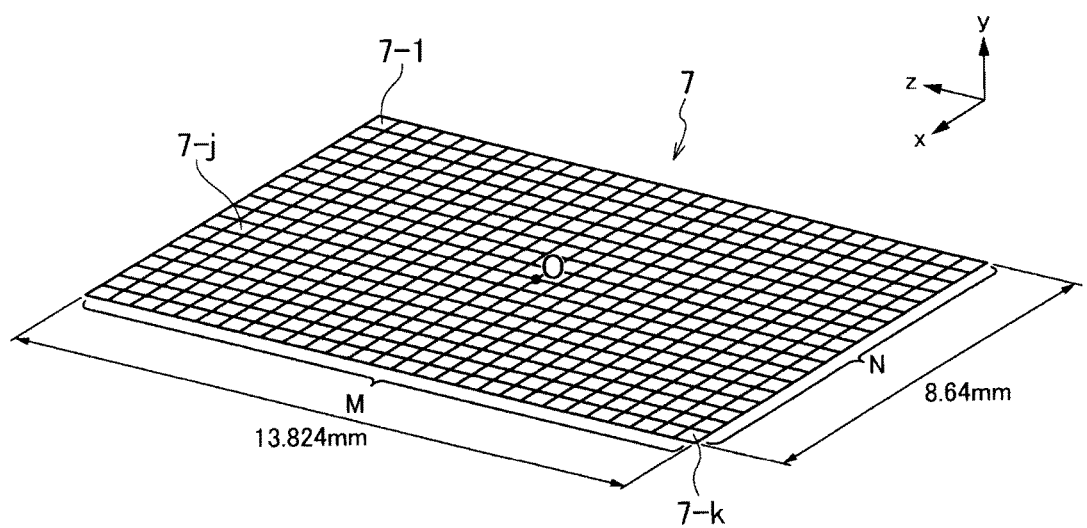
FIG. 17 is a perspective view of a DMD of the image display device.

FIG. 17 is a perspective view of the DMD 7. The DMD 7 is arranged on an approximately horizontal plane. The micromirror groups 7-1 to 7-k are two-dimensionally arranged on the DMD 7. The DMD 7 corresponds to an optical modulator.

The number M of the micromirror groups 7-1 to 7-k along the long side is 1,280 (13.824 mm) and the number N thereof along the short side is 800 (8.64 mm). The total number k thereof is M×N=1,024,000. The aspect ratio of the DMD 7 is 1280:800=16:10.

The tilts of the micromirror groups 7-1 to 7-k are independently varied so as to be able to change the reflection angle of a light beam. Herein, the deflection angles of the micromirror groups 7-1 to 7-k are about ±12 degrees.

Each of the micromirror groups 7-1 to 7-k becomes turned on or off depending on the reflection angle of a light beam.

When they are ON, the reflected light by the micromirrors is projected to the subsequent projection system 8A while when they are OFF, the reflected light thereby travels away from the projection system 8A.

Figure 18:
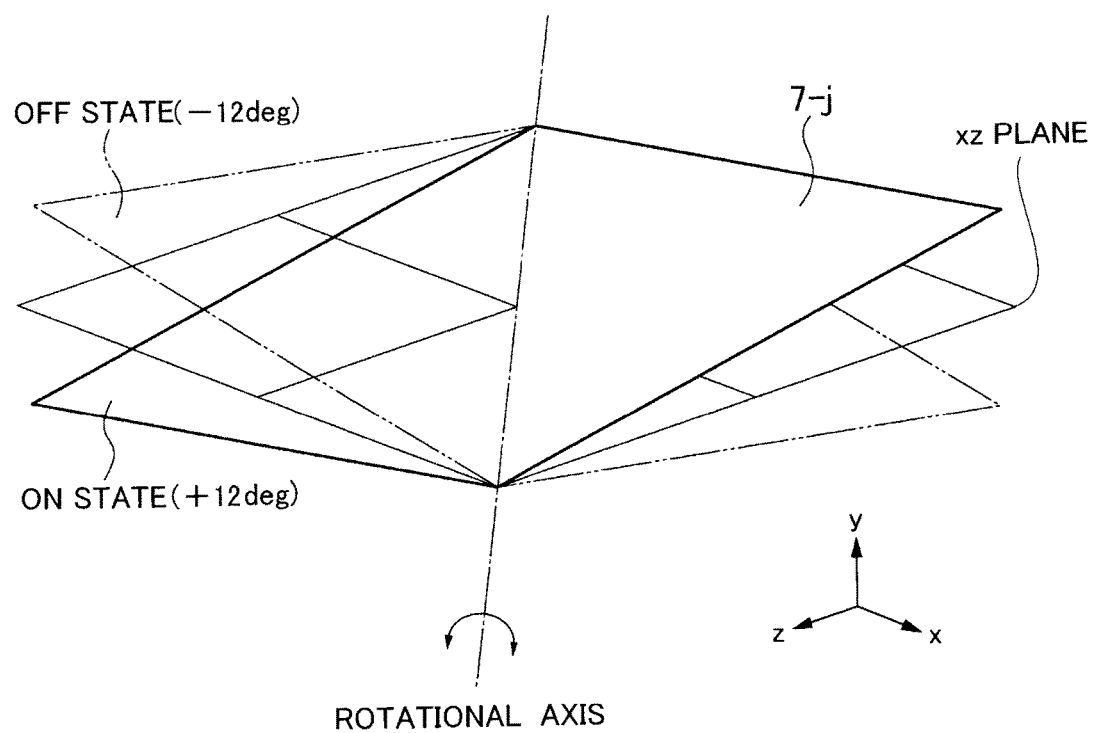
FIG. 18 is shows a tilting of a micromirror of the DMD.

FIG. 18 shows the inclined state of the micromirror groups 7-1 to 7-k of the DMD 7 of the image display device 100A, taking a micromirror 7-j for example. The micromirror 7-j is rotated about an axis parallel to a line of x=z on the xz plane, that is, x' axis.

At the tilt angle of +12 degrees relative to the xz plane (ON state), the micromirror 7-j reflects the light beam (first light beam) to the projection system 8A (to a first direction). At the tilt angle of −12 degrees (OFF state), it reflects the light beam away from the projection system 8A (to a second direction).

That is, the reflected light beam by the DMD 7 includes a first light beam traveling to the projection system 8A which projects the light beam to the projection plane 101.

The light beam from the second mirror 5 is emitted to the DMD 7 in a direction crossing the rotational axis of the micromirror 7-j, that is, a direction from a space on the −x, +z, and +y axes to the origin.

The micromirrors 7-m to 7-n (m and n are integers 1 or more to k or less) in ON state reflect the light beam from the second mirror 5 to the projection system 8A. The projection system 8A projects the light beam onto the projection plane 101 placed in parallel to a plane including the y-axis and z-axis. Here, the size of an image projected on the projection plane 101 is 80 inches at a maximum.

Next, the structure of the projection system 8A to project the light beam from the DMD 7 onto the projection plane 101 is described.

Figure 19:
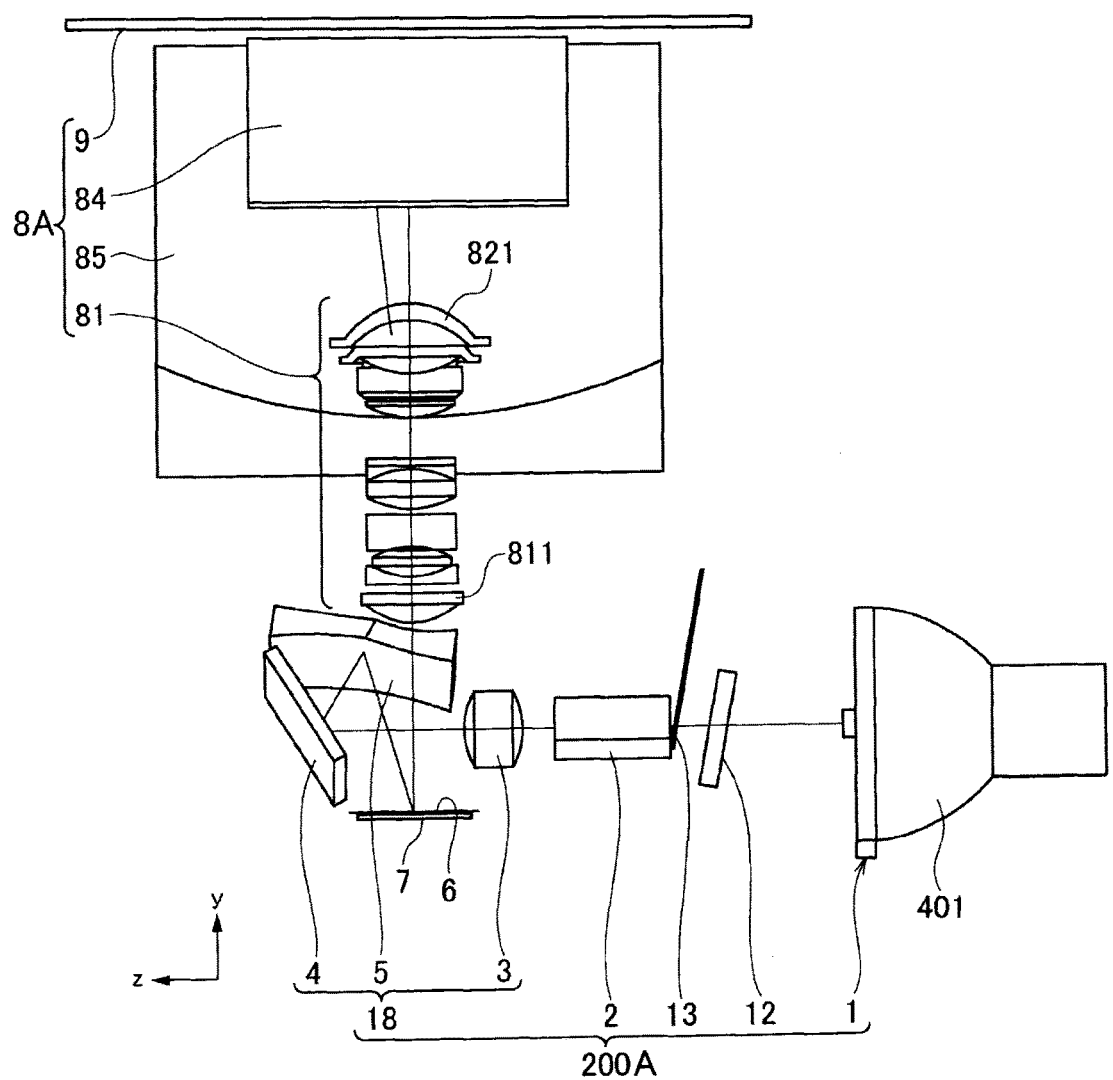
FIG. 19 schematically shows the structure of a lens system of a projection system of the image display device.

FIG. 19 schematically shows the structure of the projection system 8A. The projection system 8A comprises a lens barrel 10, a lens system 81, a first projection mirror 84, and a second projection mirror 85, and the planar glass 9. The light beam reflected by the DMD 7 is reflected by the projection system 8A to the projection plane 101.

The lens barrel 10 holds the lens system 81.

Figure 20:
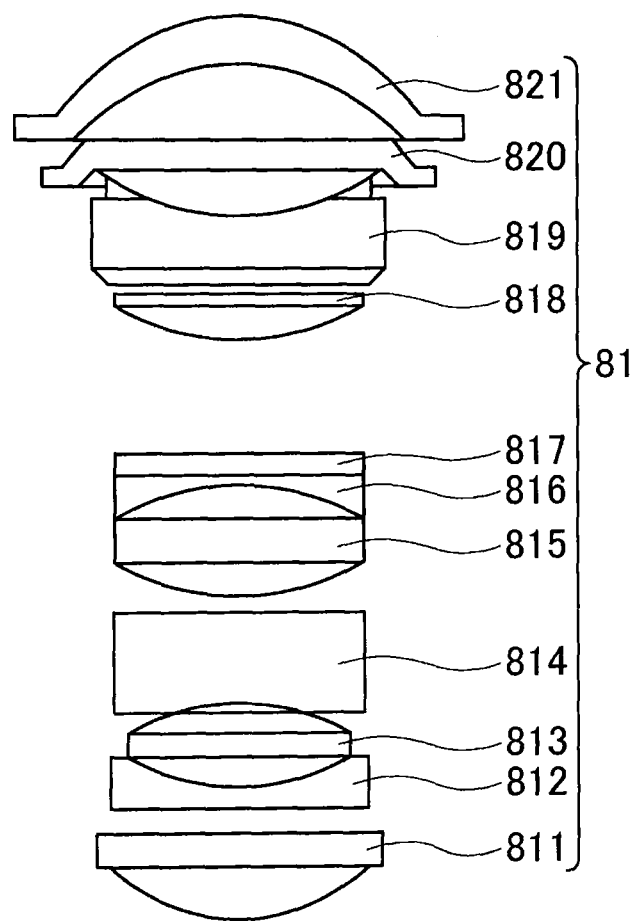
FIG. 20 shows the structure of the projection lens system.

FIG. 20 schematically shows the structure of the lens system 81 of the projection system 8A. The lens system 81 comprises 11 lenses, first to eleventh lenses 811 to 821.

An incidence end of the lens system 81 is the first lens 811 and an exit end thereof is the eleventh lens 821.

The optical axis of the lens system 81 is along the y-axis and the projection plane 101 is placed to be parallel to the optical axis of the lens system 81. The first and second projection mirrors 84, 85 are disposed to project the light beam having transmitted through the lens system 81 toward the projection plane 101.

Table 10 shows the specification of the lens system 81.

TABLE 10

| face No. | R | d | nd | vd | |
|---|---|---|---|---|---|
| 1 | 19.964 | 4.024 | 1.5176 | 63.5 | lens 811 |
| 2 | −194.535 | 0.223 | | | lens 811 |
| 3 | 57.339 | 1.949 | 1.8830 | 40.8 | lens 812 |
| 4 | 12.164 | 6.389 | 1.4875 | 70.4 | lens 813 |
| 5 | −20.746 | 0.333 | | | lens 813 |
| 6 | −59.627 | 7.841 | 1.7306 | 37.6 | lens 814 |
| 7 | 49.429 | 0.605 | | | lens 814 |
| 8 | 19.401 | 6.781 | 1.5810 | 40.9 | lens 815 |
| 9 | −16.196 | 2.210 | 1.9040 | 31.3 | lens 816 |
| 10 | −29.57 | 6.866 | | | lens 816 |
| 11 | −154.02 | 1.822 | 1.5022 | 68.8 | lens 817 |
| 12 | 27.678 | 0.300 | | | lens 817 |
| 13 | 16.284 | 4.695 | 1.7068 | 29.8 | lens 818 |
| 14 | −53.869 | 1.663 | | | lens 818 |
| 15 | −26.356 | 1.800 | 1.9040 | 31.3 | lens 819 |
| 16 | 16.351 | 3.289 | | | lens 819 |
| 17 | −20.191 | 1.800 | 1.5316 | 55.8 | lens 820 |
| 18 | −31.084 | 8.111 | | | lens 820 |
| 19 | −16.01 | 4.125 | 1.5316 | 55.8 | lens 821 |
| 20 | −14.27 | | | | lens 821 |

In Table 10 R is a curvature radius of a lens face in question, d is an interval between adjacent lens surfaces, and nd is a refraction index of each lens relative to a D-line and vd is an Abbe number of each lens.

In Table 10 both surfaces of the first, tenth, and eleventh lenses 811, 820, and 821 are aspheric surfaces.

Table 11 shows the aspheric coefficients of the first, tenth, and eleventh lenses 811, 820, and 821. The shapes of the aspheric surfaces thereof are represented by the above-described Expression 4 and the aspheric coefficients in Table 11.

TABLE 11

| lens 811 | aspheric coefficient $c_{04}$ | 6.750330E−05 |
| | aspheric coefficient $c_{06}$ | 2.106239E−07 |
| | aspheric coefficient $c_{08}$ | 4.589854E−09 |
| | aspheric coefficient $c_{10}$ | −2.480613E−11 |
| | aspheric coefficient $c_{12}$ | −1.914714E−13 |
| | aspheric coefficient $c_{14}$ | 7.962944E−15 |
| | aspheric coefficient $c_{16}$ | 9.765820E−18 |
| | aspheric coefficient $c_{04}$ | 8.850207E−05 |
| | aspheric coefficient $c_{06}$ | 2.599021E−07 |
| | aspheric coefficient $c_{08}$ | 2.928829E−09 |
| | aspheric coefficient $c_{10}$ | 3.664243E−11 |
| | aspheric coefficient $c_{12}$ | −1.018063E−12 |
| | aspheric coefficient $c_{14}$ | 1.012708E−14 |
| | aspheric coefficient $c_{16}$ | 9.188785E−17 |
| lens 820 | aspheric coefficient $c_{04}$ | 1.291913E−04 |
| | aspheric coefficient $c_{06}$ | 2.804087E−06 |
| | aspheric coefficient $c_{08}$ | −1.168735E−07 |
| | aspheric coefficient $c_{10}$ | 2.477830E−09 |
| | aspheric coefficient $c_{12}$ | −2.811971E−11 |
| | aspheric coefficient $c_{14}$ | 1.571829E−13 |
| | aspheric coefficient $c_{16}$ | −3.346058E−16 |
| | aspheric coefficient $c_{04}$ | 8.369424E−05 |
| | aspheric coefficient $c_{06}$ | 2.805544E−07 |
| | aspheric coefficient $c_{08}$ | −1.645944E−08 |
| | aspheric coefficient $c_{10}$ | 2.012555E−10 |
| | aspheric coefficient $c_{12}$ | −6.351043E−13 |
| | aspheric coefficient $c_{14}$ | −5.562187E−15 |
| | aspheric coefficient $c_{16}$ | 1.413619E−17 |
| lens 821 | aspheric coefficient $c_{04}$ | 1.720445E−05 |
| | aspheric coefficient $c_{06}$ | −1.048542E−06 |
| | aspheric coefficient $c_{08}$ | 8.610665E−09 |
| | aspheric coefficient $c_{10}$ | −1.738139E−11 |
| | aspheric coefficient $c_{12}$ | −7.253682E−14 |
| | aspheric coefficient $c_{14}$ | −2.849886E−17 |
| | aspheric coefficient $c_{16}$ | 2.269214E−18 |
| | aspheric coefficient $c_{04}$ | 2.595314E−05 |
| | aspheric coefficient $c_{06}$ | −6.354212E−07 |
| | aspheric coefficient $c_{08}$ | 1.020103E−08 |
| | aspheric coefficient $c_{10}$ | −1.317664E−10 |

TABLE 11-continued

| aspheric coefficient $c_{12}$ | 1.166266E−12 |
| aspheric coefficient $c_{14}$ | −5.476703E−15 |
| aspheric coefficient $c_{16}$ | 1.077343E−17 |

Note that the optical axis of the lens system 81 can be placed approximately orthogonal to the projection plane 101.

The first projection mirror 84 reflects the light beam from the lens system 81 to the second projection mirror 85.

Figure 21:
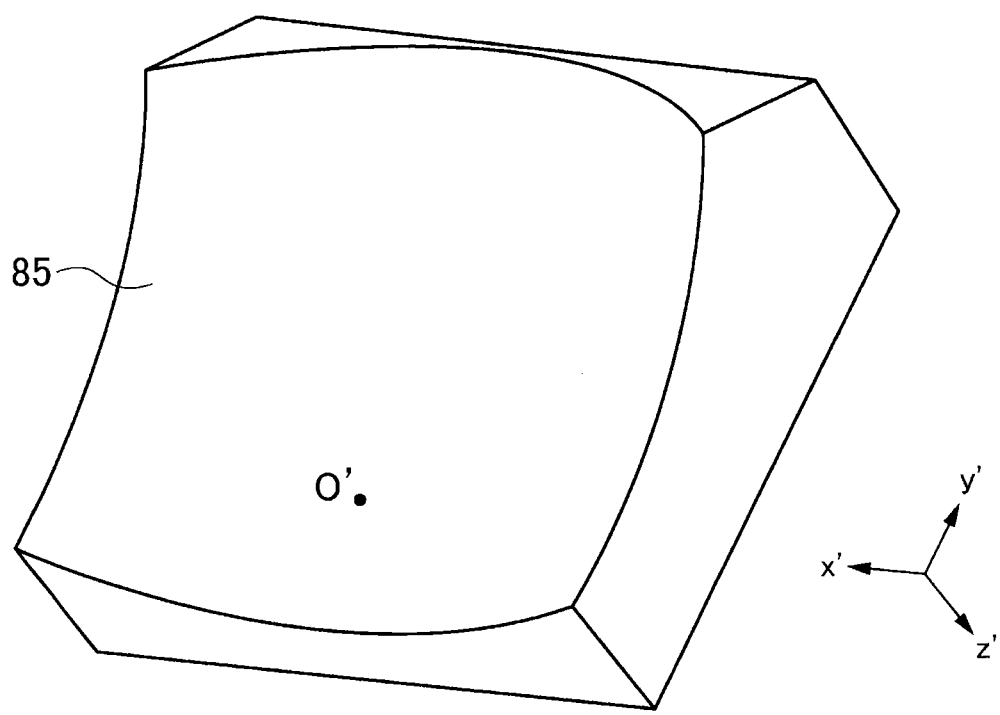
FIG. 21 schematically shows the structure of a second projection mirror of the projection system.

FIG. 21 is a perspective view of the second projection mirror 85 of the projection system 8A. The reflective surface of the second projection mirror 85 includes a free-form surface so as to correct vertical and horizontal distortion of an image projected on the projection plane 101.

Herein, the free-form surface refers to an anamorphic surface with a not constant x-axis curvature at an arbitrary y-axis position in accordance with an x-axis position and with a not constant y-axis curvature at an arbitrary x-axis position in accordance with a y-axis position.

Figure 22:
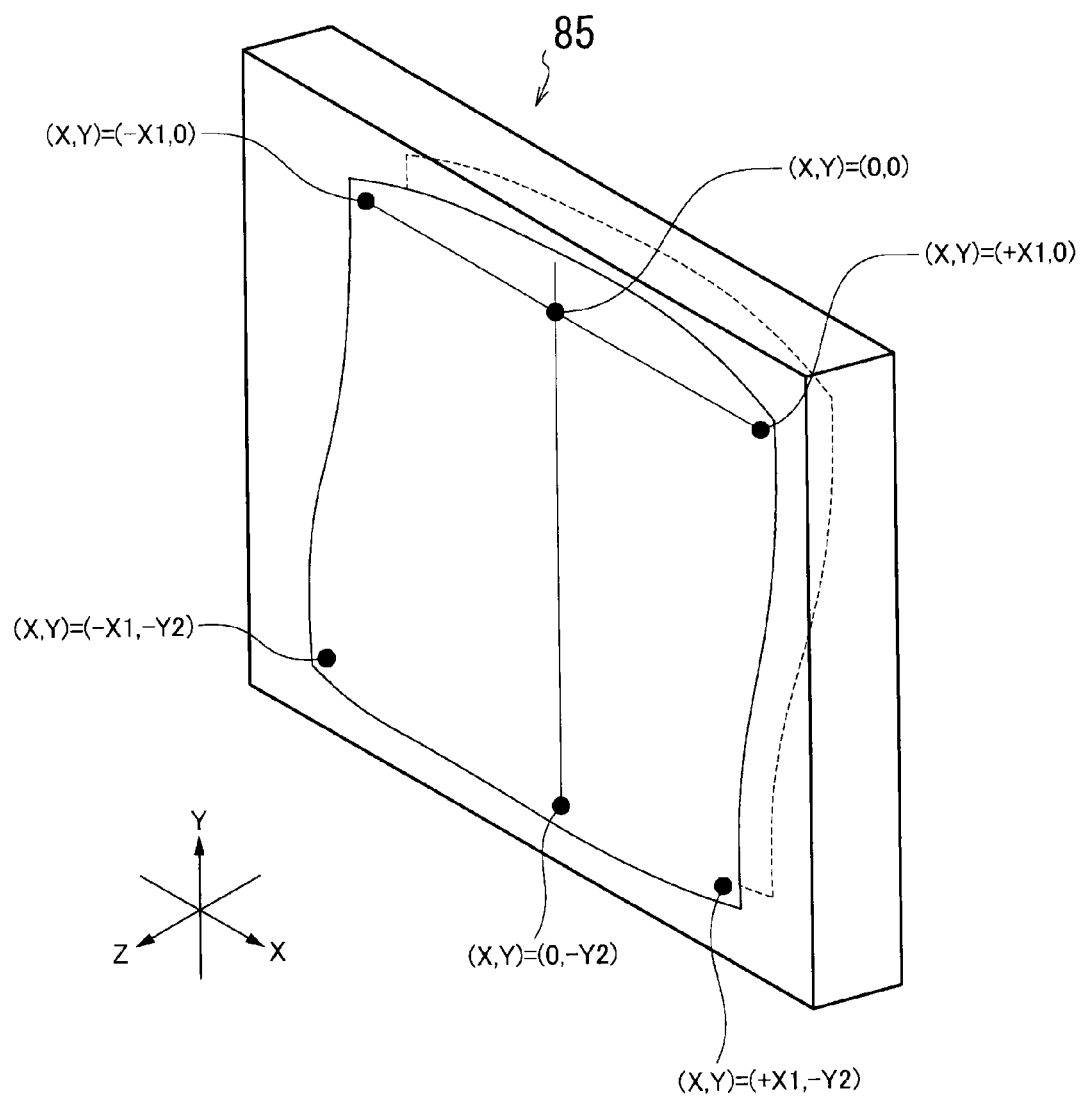
FIG. 22 is a perspective view of the coordinates of the second projection mirror.

FIG. 22 shows the shape of the free-form surface. In the drawing, at Y=0 position, X-axis curvatures at the positions of the lens surface, (X,Y)=(0,0), (X,Y)=(−X1,0), and (X,Y)=(+X1,0) differ from each other. Similarly, at X=0 position, Y-axis curvatures at positions (X,Y)=(0,0) and (X,Y)=(0,−Y2) differ from each other.

Moreover, at the position (X,Y)=(0,0) the X and Y-axes curvatures differ from each other.

Table 12 shows the aspheric coefficients of the reflective surface of the second projection mirror 85. The reflective surface of the second projection mirror 85 is an aspheric surface represented by the following Expression 6 and the aspheric coefficients in Table 12 in the local coordinate system (x'y'z') of FIG. 21.

$$z'(x', y') = \frac{cr^2}{1+\sqrt{1-c^2 r^2}} + \sum_{k}\sum_{k,j} c_{k,j} (x')^k (y')^j, \quad \text{Expression 6}$$

$$c = \frac{1}{R}, \quad r = \sqrt{(x')^2 + (y')^2}$$

TABLE 12

| | curvature radius R | ∞ (planar) |
|---|---|---|
| projection mirror 85 | aspheric coefficient $c_{2,0}$ | 5.861336E−03 |
| | aspheric coefficient $c_{0,2}$ | 2.299409E−03 |
| | aspheric coefficient $c_{2,1}$ | 3.447998E−05 |
| | aspheric coefficient $c_{0,3}$ | 3.902694E−06 |
| | aspheric coefficient $c_{4,0}$ | 2.031034E−07 |
| | aspheric coefficient $c_{2,2}$ | 4.709163E−07 |
| | aspheric coefficient $c_{0,4}$ | 7.126801E−08 |
| | aspheric coefficient $c_{4,1}$ | 4.007452E−09 |
| | aspheric coefficient $c_{2,3}$ | 5.067003E−09 |
| | aspheric coefficient $c_{0,5}$ | −1.490065E−09 |
| | aspheric coefficient $c_{6,0}$ | −1.195799E−10 |
| | aspheric coefficient $c_{4,2}$ | 1.211113E−11 |
| | aspheric coefficient $c_{2,4}$ | −8.261563E−11 |
| | aspheric coefficient $c_{0,6}$ | 1.615799E−10 |
| | aspheric coefficient $c_{6,1}$ | −4.124172E−12 |
| | aspheric coefficient $c_{4,3}$ | −1.810118E−12 |
| | aspheric coefficient $c_{2,5}$ | 3.618342E−12 |
| | aspheric coefficient $c_{0,7}$ | −3.759000E−12 |
| | aspheric coefficient $c_{8,0}$ | 1.030317E−13 |
| | aspheric coefficient $c_{6,2}$ | −3.644868E−14 |
| | aspheric coefficient $c_{4,4}$ | 1.388509E−13 |
| | aspheric coefficient $c_{2,6}$ | −2.148588E−14 |
| | aspheric coefficient $c_{0,8}$ | −4.698124E−14 |
| | aspheric coefficient $c_{8,1}$ | 3.085129E−15 |
| | aspheric coefficient $c_{6,3}$ | 2.856688E−15 |

TABLE 12-continued

| | curvature radius R | ∞ (planar) |
|---|---|---|
| | aspheric coefficient$_{4,5}$ | −1.090944E−15 |
| | aspheric coefficient$_{2,7}$ | 3.429217E−15 |
| | aspheric coefficient$_{0,9}$ | 2.390548E−15 |
| | aspheric coefficient$_{10,0}$ | −4.894122E−17 |
| | aspheric coefficient$_{8,2}$ | 5.872508E−17 |
| | aspheric coefficient$_{6,4}$ | −1.117660E−17 |
| | aspheric coefficient$_{4,6}$ | −2.225495E−16 |
| | aspheric coefficient$_{2,8}$ | 5.642092E−18 |
| | aspheric coefficient$_{0,10}$ | 1.647124E−17 |
| | aspheric coefficient$_{10,1}$ | −1.051485E−18 |
| | aspheric coefficient$_{8,3}$ | −2.407368E−18 |
| | aspheric coefficient$_{6,5}$ | −9.526972E−19 |
| | aspheric coefficient$_{4,7}$ | 3.675664E−18 |
| | aspheric coefficient$_{2,9}$ | −5.348885E−18 |
| | aspheric coefficient$_{0,11}$ | −8.796724E−19 |
| | aspheric coefficient$_{12,0}$ | 1.280434E−20 |
| | aspheric coefficient$_{10,2}$ | −3.018432E−20 |
| | aspheric coefficient$_{8,4}$ | −2.294161E−20 |
| | aspheric coefficient$_{6,6}$ | 1.615774E−19 |
| | aspheric coefficient$_{4,8}$ | 2.693197E−21 |
| | aspheric coefficient$_{2,10}$ | 9.864725E−20 |
| | aspheric coefficient$_{0,12}$ | −8.337776E−21 |
| | aspheric coefficient$_{12,1}$ | 1.485311E−22 |
| | aspheric coefficient$_{10,3}$ | 1.098791E−21 |
| | aspheric coefficient$_{8,5}$ | 5.367361E−22 |
| | aspheric coefficient$_{6,7}$ | −3.052206E−21 |
| | aspheric coefficient$_{4,9}$ | 1.632099E−21 |
| | aspheric coefficient$_{2,11}$ | 2.499589E−22 |
| | aspheric coefficient$_{0,13}$ | 4.076615E−22 |
| | aspheric coefficient$_{14,0}$ | −1.423270E−24 |
| | aspheric coefficient$_{12,2}$ | 5.605448E−24 |
| | aspheric coefficient$_{10,4}$ | 4.172579E−24 |
| | aspheric coefficient$_{8,6}$ | −2.701329E−23 |
| | aspheric coefficient$_{6,8}$ | 1.125683E−24 |
| | aspheric coefficient$_{4,10}$ | −4.987119E−23 |
| | aspheric coefficient$_{2,12}$ | −1.758726E−23 |
| | aspheric coefficient$_{0,14}$ | −3.613684E−24 |
| | aspheric coefficient$_{14,1}$ | −4.066279E−27 |
| | aspheric coefficient$_{12,3}$ | −1.931199E−25 |
| | aspheric coefficient$_{10,5}$ | 3.002305E−27 |
| | aspheric coefficient$_{8,7}$ | 3.511542E−25 |
| | aspheric coefficient$_{6,9}$ | 1.893875E−25 |
| | aspheric coefficient$_{4,11}$ | 3.499850E−25 |
| | aspheric coefficient$_{2,13}$ | 1.054943E−25 |
| | aspheric coefficient$_{0,15}$ | 8.602497E−27 |

Further, Table 13 shows the specifications of the optical elements of the projection system 8A excluding the lens system 81 and second projection mirror 85. Note that diaphragms 1 to 3 in the table are not shown in the drawings.

TABLE 13

| projection mirror 84 | curvature radius R | ∞ (planar) |
|---|---|---|
| planar glass 9 | curvature radius R | ∞ (planar) |
| | center thickness | 3.00 mm |
| | nd | 1.5168 |
| | νd | 64.2 |
| diaphragm 1 | aperture diameter | 15.6 mm |
| diaphragm 2 | aperture diameter | 14.8 mm |
| diaphragm 3 | aperture diameter | 18.2 mm |

Table 14 shows the coordinates of the optical elements of the projection system 8A when the screen size projected on the projection plane 101 is 43 inches.

TABLE 14

| lens 811 | x | 6.340 |
|---|---|---|
| (vertex of incidence surface) | y | 44.160 |
| | z | 0 |

TABLE 14-continued

| projection mirror 84 | x | 6.340 |
|---|---|---|
| (reflective surface) | y | 170.569 |
| | z | 0 |
| | α | 0 |
| | β | −90 |
| | γ | 45 |
| projection mirror 85 | x | −48.660 |
| (local coordinate origin | y | 105.269 |
| of reflective surface) | z | 0 |
| | α | −90 |
| | β | 39.7 |
| | γ | 90 |
| planar glass 9 | x | −48.660 |
| | y | 173.569 |
| | z | 0 |
| projection plane 101 | x | 136 |
| | y | 595 |
| | z | 0 |
| | α | 0 |
| | β | −90 |
| | γ | 0 |
| diaphragm | x | 6.340 |
| | y | 48.184 |
| | z | 0 |

Notes:
The units of x, y, z are [mm] and those of α, β, γ are degrees.
α, β, γ are rotations about x-axis, y-axis, z-axis, respectively.
Rotations occurred in the order of α, β, γ.
Clockwise α and β rotations are negative and clockwise γ rotation is positive.
α = 90 and β = γ = 0 for lenses 811 and 821 and planar plate 9.

As shown in the table, the image display device 100A is configured to project a light beam obliquely upward to the projection plane 101.

The planar glass 9 is disposed behind the second projection mirror 85 on the optical path. It is close to the top ends of the first and second mirrors 84, 85 and parallel to a plane including the x-axis and z-axis. The planar glass 9 is fitted into an opening at the top of a not-shown housing of the image display device 100A for the purpose of dust proofing inside the device 100A.

Figure 23:
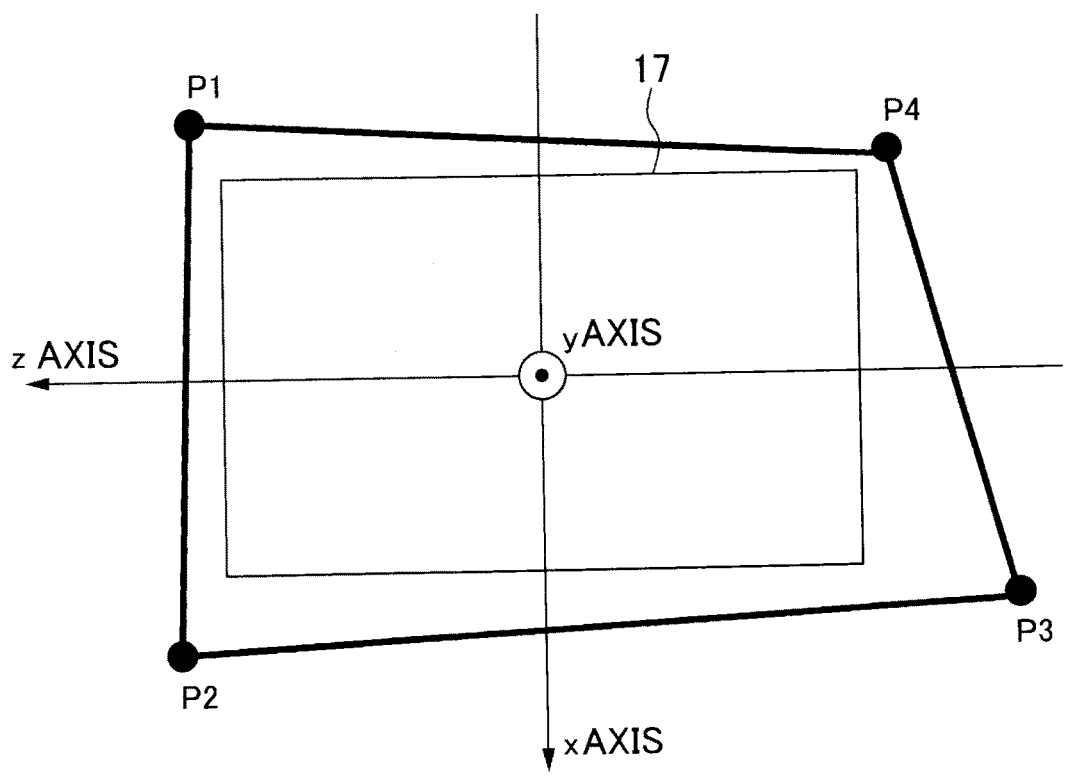
FIG. 23 shows the relationship between the effective area of the DMD and an illumination area of a light beam irradiated from the top of an optical tunnel opening.

Next, the positional relationship between the DMD 7 and second mirror 5 is described. FIG. 23 shows the effective area of the DMD 7 and the illumination area of the light beam emitted from the top of the opening of the optical tunnel 2 and reflected by the second mirror 5 to the DMD 7.

Herein, assumed that a light beam is emitted from the vertexes or points of the four corner of the opening of the exit end 22 of the optical tunnel 2 and collected at four points P1 to P4 on a virtual plane placed at y=0 in parallel to the xz plane. That is, the light-colleting points P1 to P4 are at barycentric coordinate positions of the light beams from each point of the four corners of the opening of the optical tunnel 2 on a virtual plane on the same plane as the reflective surface of the DMD 7.

As shown in FIG. 23, a distorted quadrangle is formed by virtually connecting the light-collecting points P1 to P4.

Generally, in terms of an illumination system in which optical elements such as lenses or mirrors are eccentrically arranged in a three-dimensional space, the shape of an image formed on a DMD is distorted from a rectangular shape of an optical tunnel even if the opening of the optical tunnel is perfectly rectangular.

Considering a DMD loss, it is not expedient to decrease the DMD projection beam in size for the purpose of securing a margin of adjusting the positions of the DMD projection beam and the DMD 7. In order to suppress the DVD loss and improve the optical use efficiency of the DVD, it is effective to resolve the distortion of the DMD projection beam and make the shape of the DMD projection beam similar to the effective area of the DMD 7 as much as possible.

In view of this, the image display device 100A uses the second mirror 5 having a toroidal reflective surface. Moreover, the rotational angle γ of the second mirror 5 is set so that an angular distribution of the light from the micromirror groups 7-1 to 7-$k$ along the rotational axis z' becomes smaller than that in a direction orthogonal to the rotational axis z'. Herein, the rotational axis of the second mirror 5 at the rotational angle γ is a normal line from the vertex of the surface of the second mirror 5.

Figure 24:
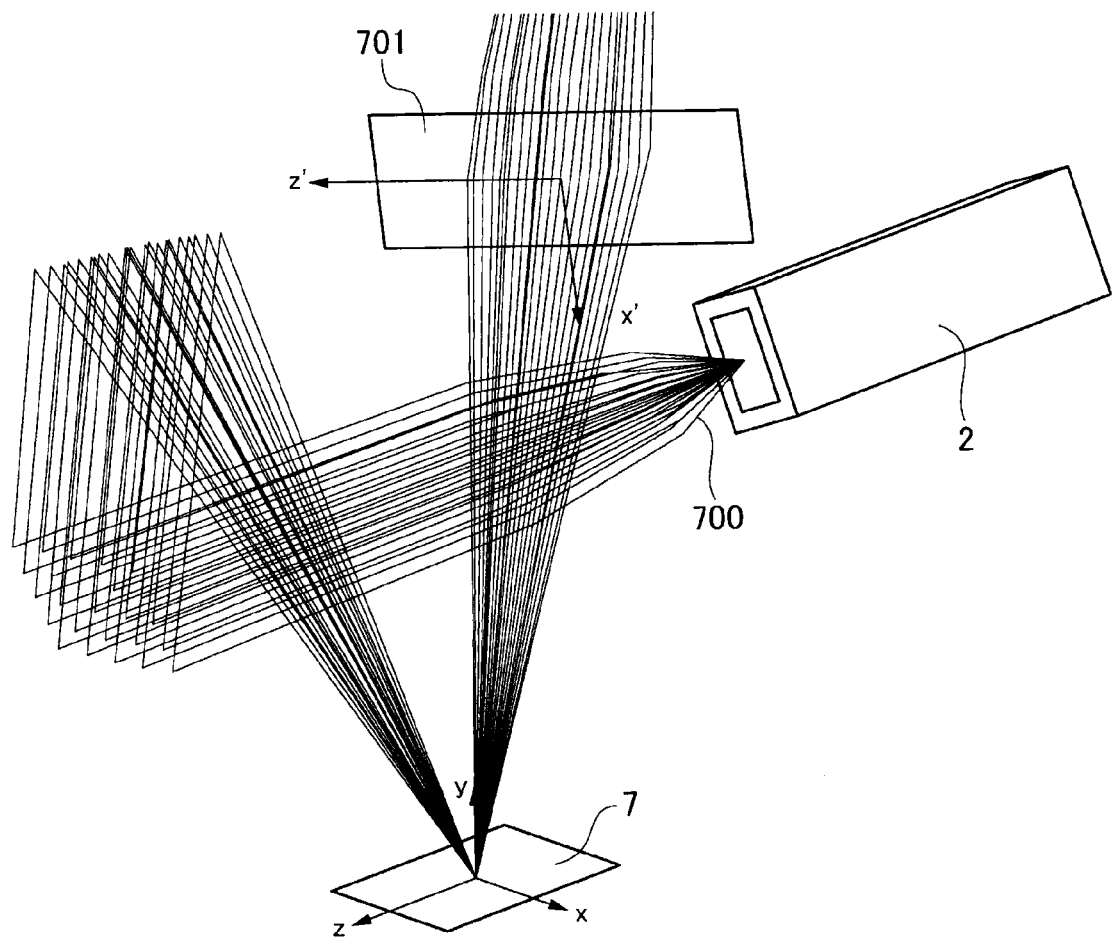
FIG. 24 shows light beams emitted from a point light source placed at the center of the exit of the optical tunnel.

Next, the illuminance distribution on a light receiver is described using simulation results referring to FIG. 24 to FIG. 27. In FIG. 24 a light receiver 701 is a virtual element used in the simulations to analyze reflected light to the projection system 8.

In the simulations LightTools® manufactured by Ora Inc., U.S.A. was used. Also, a high-pressure mercury lamp, UHP 240-190 W 0.8 E20.9 Fusion Star manufactured by Philips International was used for a light source.

FIG. 24 shows a light beam 700 from a point light source placed at the opening center of the exit end of the optical tunnel 2, that is, (x, y, z)=(−8.818, 19.025, −30.897). FIG. 24 omits showing the optical elements other than the optical tunnel 2 and DMD 7. The light receiver 701 is disposed on a virtual plane at the incidence end of the first lens 811, (x, y, z)=(5.630, 42.080, 0).

The light-receiving surface of the light receiver is set to be orthogonal to a principal ray of the light beam 700. A local coordinate system x'y'z' includes the origin at (x, y, z)= (5.630, 42.080, 0), x' axis along a line of x=z, and z' axis is orthogonal to the x' axis.

Figure 25:
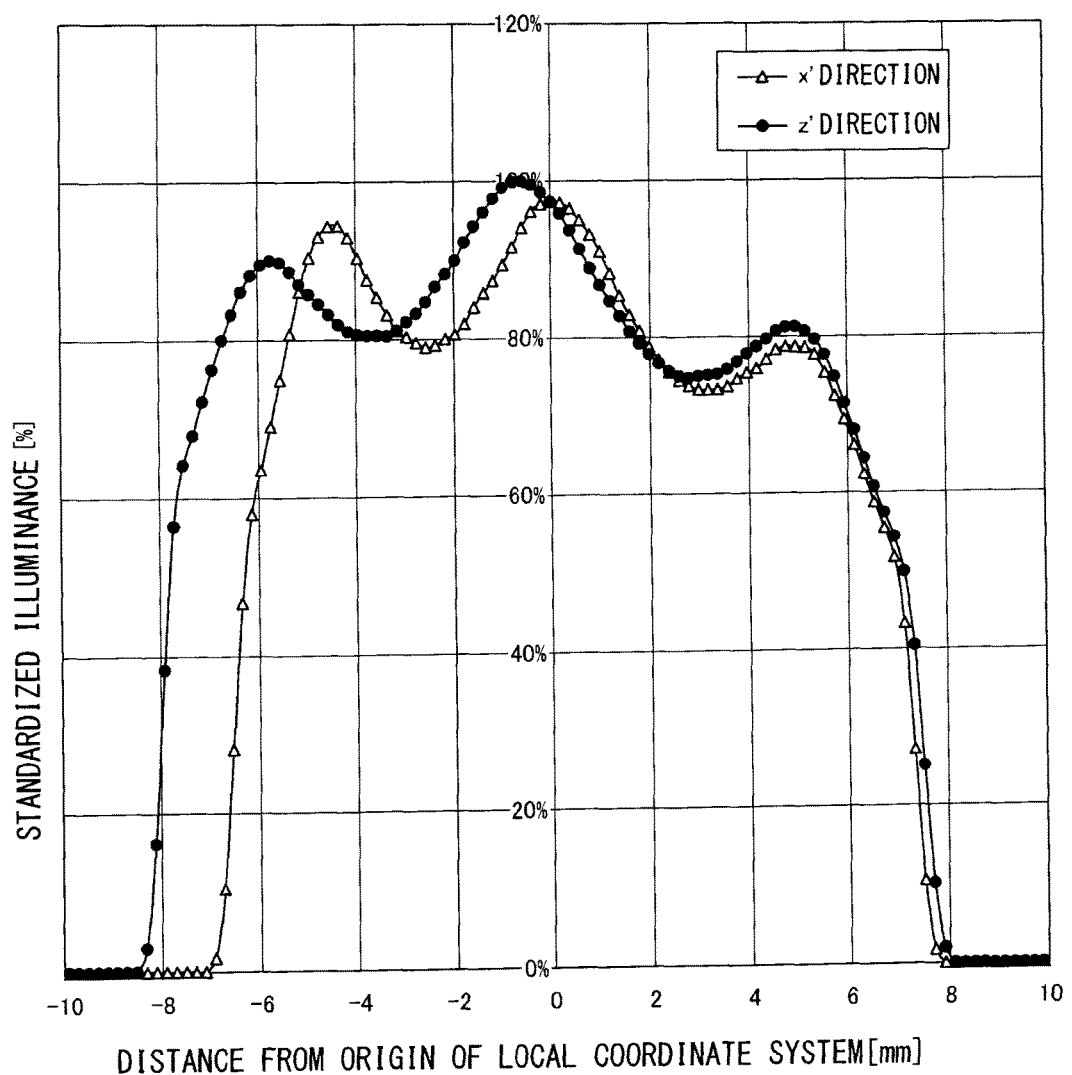
FIG. 25 is a graph showing the illuminance distribution of a light beam from the light source on a light receiver which is placed on a virtual plane at an incidence end of the projection lens system

FIG. 25 is a graph showing the illuminance distribution of the light receiver 701 which is placed on a virtual plane at the incidence end of the lens system 81 to receive a light beam from the point light source placed at the opening center of the exit end 22 of the optical tunnel 2. In the graph vertical axis indicates a standardized illuminance when the maximal illuminance on the light-receiving surface of the light receiver 701 is set to 1.0. The rotational angle γ of the second mirror 5 is set to a median design value, γ=−81.310 degrees.

Note that the larger the absolute value of which the graph and a line with standardized illuminance of 0 intersect each other, the wider the illuminance distribution.

As shown in FIG. 25, the illuminance distribution along the z' axis is wider than that along the x' axis. In other words, the angular distribution along the x' axis is smaller than that along the z' axis.

The light beam from the reflector 401 of the light source 1 is approximately symmetric and isotropic relative to the optical axis (z-axis). Therefore, the light beam reflected by the micromirrors of the DMD 7 in the first direction is set so that the angular distribution thereof along the x' axis becomes smaller than that along the z' axis.

Figure 26:
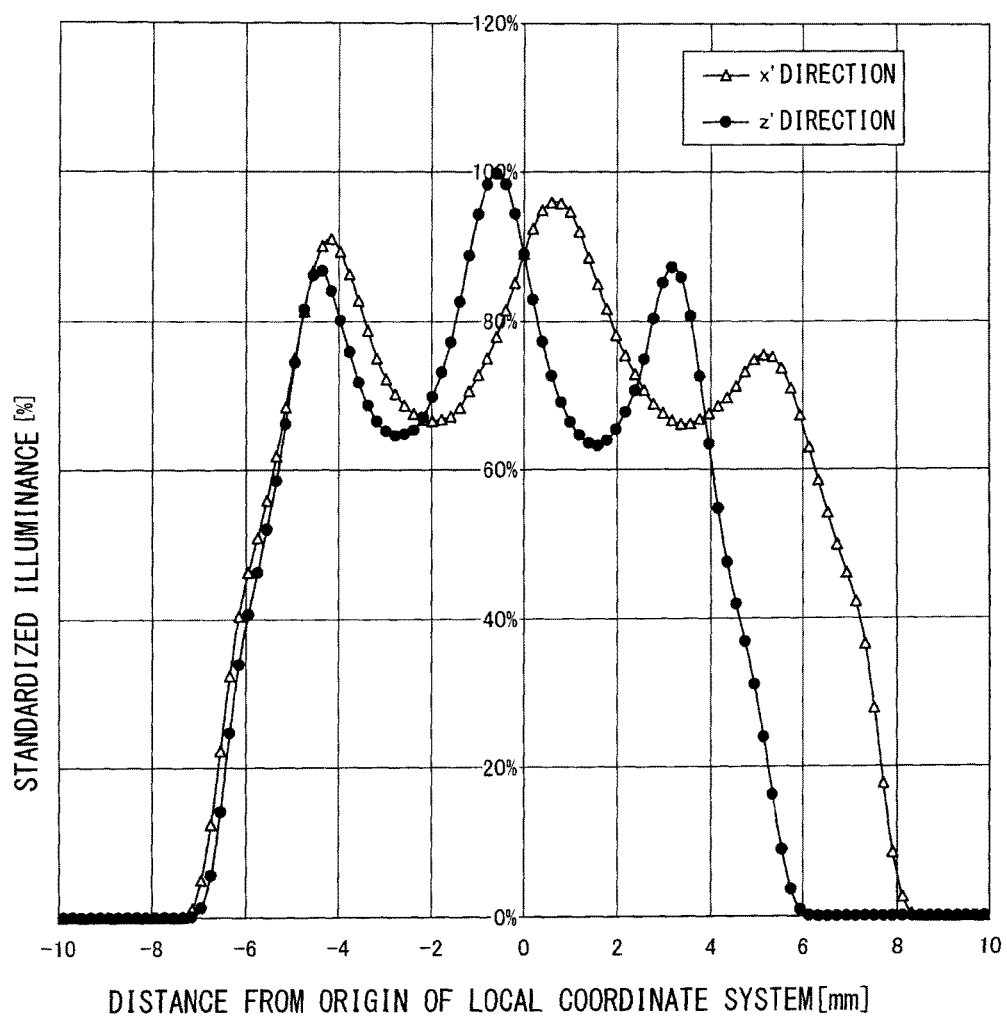
FIG. 26 is a graph showing the illuminance distribution of a light beam from the point light source on a light receiver which is placed on a virtual plane at the incidence end of a projection lens, when the rotational angle γ of a second mirror is rotated by 90 degrees from a median design value.

FIG. 26 is a graph showing the standardized illuminance distribution on the light receiver 701 calculated when the second mirror 5 is rotated from the rotational angle γ(−81.310 degree) by ±90 degrees (γ=8.640 or −171.310 degrees).

The graph of FIG. 26 is different from that of FIG. 25 in that the illuminance distribution along the x' axis is wider than that along the z' axis and the angular distribution along the z' axis is larger than that along the x' axis.

Thus, by adjusting the rotational angle γ of the second mirror 5, the angular distribution along the x' axis of the light beam reflected by the micromirrors in the first direction can be set to be smaller than that along the z' axis.

Next, the relationship between a first polygon formed by connecting the points P1 to P4 on a virtual plane and the effective area of the DMD 7 is described.

Assumed that a size of the first polygon formed by connecting the points P1 to P4 is SI and that of a second polygon is SD. The second polygon is formed by relatively shrinking or expanding the effective area 17 (FIG. 23) to internally contact the polygon SI at one or more vertexes of the effective area 17 in the polygon SI.

Figure 27:
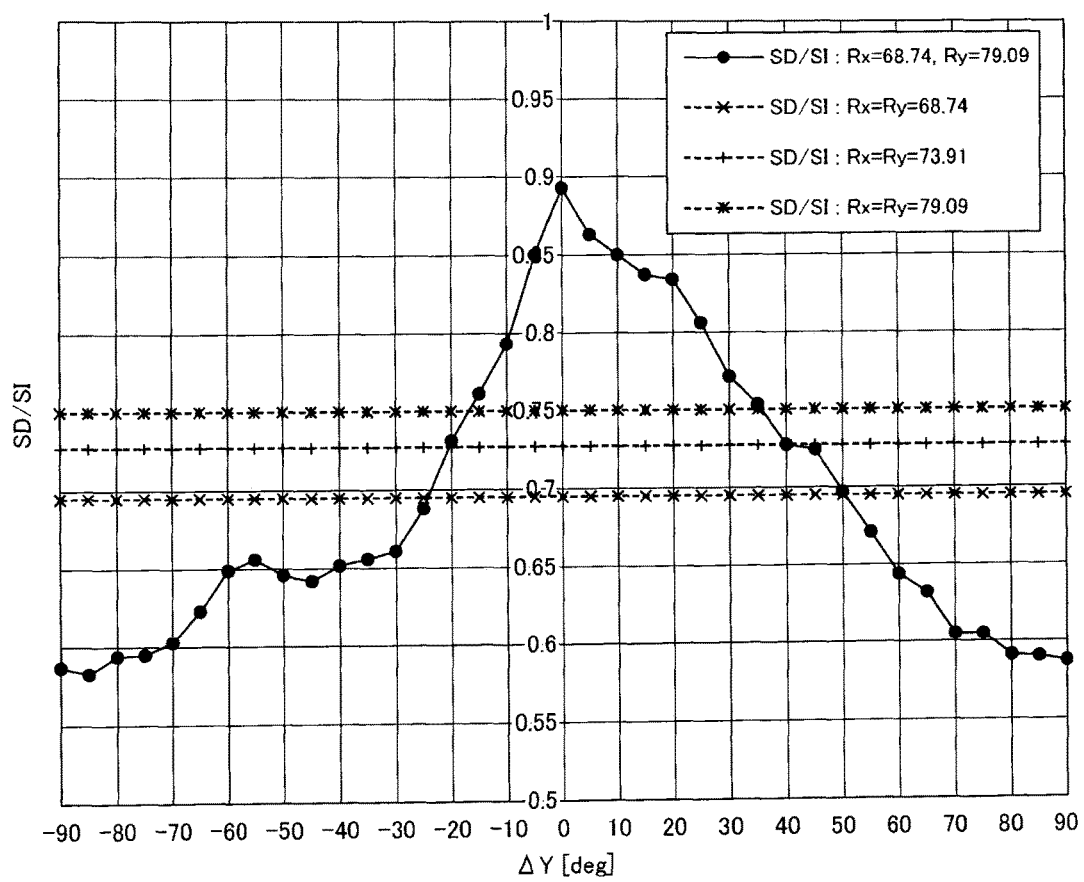
FIG. 27 is a graph showing the relationship between the rotational angle of the second mirror from the median design value and ratio SD/SI.

FIG. 27 is a graph showing the relation between the rotational angle γ of the second mirror 5 from the median design value and a ratio SD/SI when the rotational angle γ shown in Table 2 is changed from −90 to +90 degrees with the median design value (γ=−81.310) as a reference (Δγ=0).

The graph shows results when the reflective surface of the second mirror 5 is aspheric and has curvature radiuses Rx, Ry (Rx=Ry) and the curvature radiuses are changed to R=Rx, R=Ry, and R=(Rx+Ry)/2. The rotational angle γ at which the ratio SD/SI becomes maximal by use of the toroidal, reflective surface of the second mirror 5 can be found from the graph. The SD/SI is the largest at Δγ=0 so that the optical use efficiency of the DMD 7 becomes maximal.

Accordingly, by setting the rotational angle γ of the second mirror 5 as described above, the shape of the DMD projection beam can be closer to that of the effective area 17. The optical use efficiency of the DMD 7 can be improved.

Figure 28:
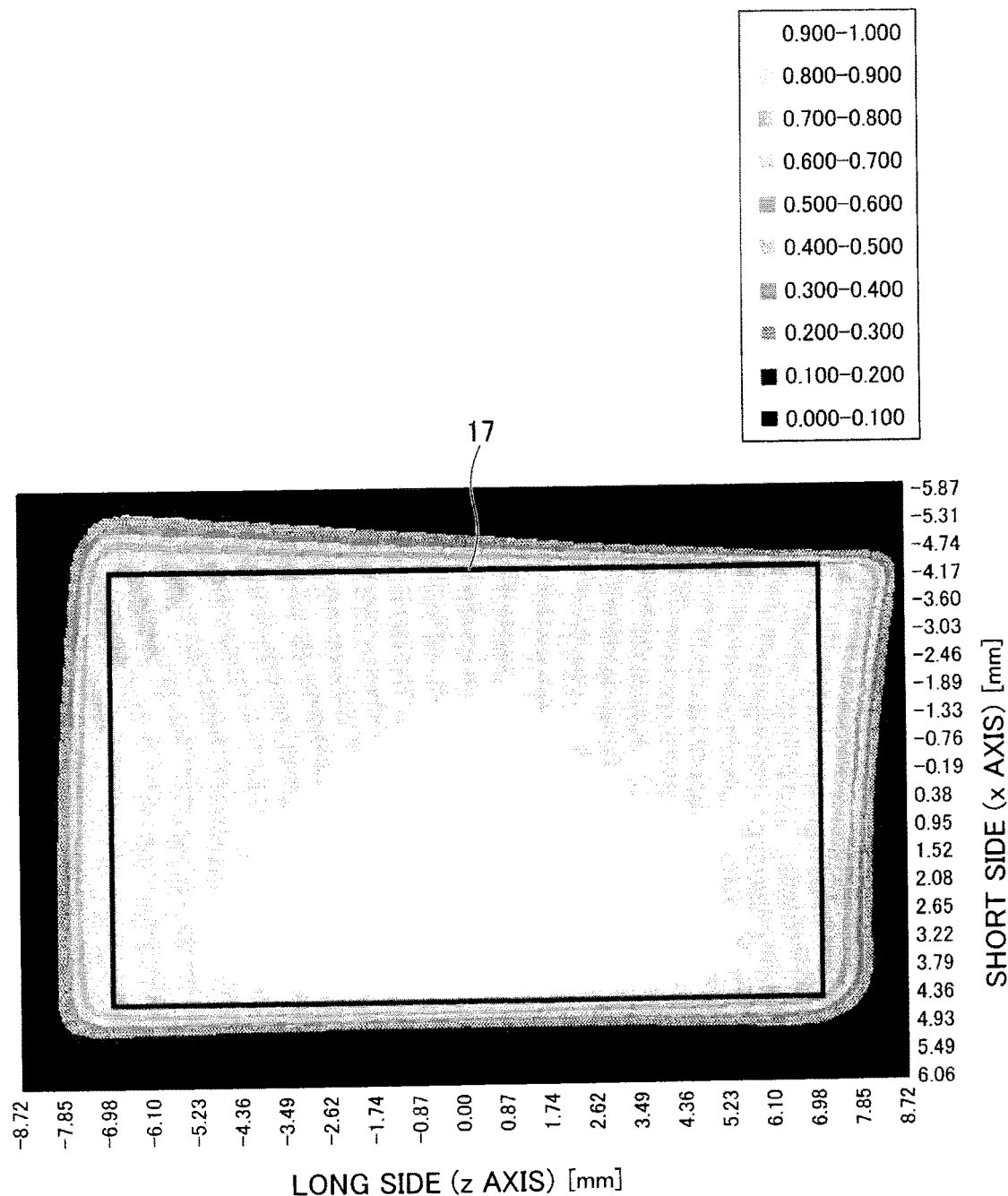
FIG. 28 shows the illuminance distribution on the DMD calculated by light beam tracking.

FIG. 28 shows the illuminance distribution on the DMD 7 calculated by light beam tracking. In FIG. 28 the area by circumscribed by the black line is the effective area 17 of the DVD. The illuminance distribution is standardized with the maximal illuminance in the area set to 1.0 or 100%.

As seen from FIG. 28, the mean value of ANSI (American National Standards Institute) at 9 points of the effective area 17 is 89.3%. That is, the illuminance distribution of the effective area 17 is uniform. Note that ANSI at 9 points refers to the illuminance of the center of each of nine equally divided areas of the effective area 17.

According to the present embodiment the optical use efficiency of the DMD 7 can be adjusted by adjusting the rotational angle γ of the second mirror 5. Thus, it is made possible to brightly illuminate the projection plane with a simple structure.

The above embodiments have described a projector type image display device by way of example. However, the present invention is applicable to a projector to display video signals from a video reproducing device such as a personal computer, TV, DVD player.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An illumination unit, comprising:
    a light source;
    an optical mixer to form secondary light sources from a light beam from the light source; and
    an illumination system to illuminate an optical modulator with the light beam from the optical mixer, including an optical element having an anamorphic surface, wherein
    the optical element is rotated at a certain rotational angle about a rotational axis which is a normal line from a vertex of a surface of the optical element, and
    the rotational angle is set to an angle so that a ratio SD/SI becomes maximal, where SI is a size of a first polygon formed by connecting light collecting points of a light beam from vertexes of the optical mixer on a virtual plane which is on a same plane as a reflective surface of the optical modulator, and SD is a size of a second polygon formed by relatively shrinking or expanding an effective area of the optical modulator to internally contact the first polygon at at least one vertex in the first polygon.

2. The illumination unit according to claim 1, wherein when a light beam is radiated from four vertexes of the optical mixer and collected at four points of a virtual plane placed at a certain position of an optical path, and the four points are connected to form a quadrangle,
the certain rotational angle is set to an angle so that a mean value of distances along a x-axis between coordinates of two opposite short sides of the quadrangle becomes minimal, the x-axis is one direction on a surface of the optical modulator.

3. The illumination unit according to claim 2, wherein the optical element is a mirror having an anamorphic surface.

4. The illumination unit according to claim 2, wherein the anamorphic surface is a toroidal surface.

5. The illumination unit according to claim 2, wherein the illumination system comprises a lens system, a planar mirror, and the optical element arranged in order on an optical path from the optical mixer to the optical modulator.

6. The illumination unit according to claim 5, wherein the lens system comprises a single lens.

7. An image display device, comprising:
the illumination unit according to claim 2;
an optical modulator illuminated with a light beam from the illumination unit; and
a projection system to project an image formed by the optical modulator onto a projection plane.

8. The image display device according to claim 7, wherein an optical efficiency of the illumination system from a light emission from the light source to a light projection from the projection system is higher than an efficiency of an illumination system including an optical element having a spherical surface with a maximal curvature radius of the anamorphic surface and an optical mixer of a size equal to the mean value of the distances between the coordinates.

9. The illumination unit according to claim 1, wherein:
the light beam reflected by the optical modulator includes a first light beam reflected to the projection system which projects the light beam to the projection plane;
the rotational angle is set to an angle so that an angular distribution of the first light beam along a rotational axis of micromirrors of the optical modulator becomes smaller than the angular distribution of the first light beam in a direction orthogonal to the rotational angle of the micromirrors.

10. The illumination unit according to claim 1, wherein the optical element is a mirror.

11. The illumination unit according to claim 1, wherein the anamorphic surface is a toroidal surface.

12. The illumination unit according to claim 1, wherein the illumination system comprises a lens system, a planar mirror, and the optical element arranged in order on an optical path from the optical mixer to the optical modulator.

13. The illumination unit according to claim 12, wherein the lens system comprises a single lens.

14. An image display device, comprising:
the illumination unit according to claim 1;
an optical modulator to reflect a light beam from the illumination unit; and
a projection system to project the light beam from the optical modulator onto a projection plane.

* * * * *